US012360996B2

(12) United States Patent
Newman et al.

(10) Patent No.: US 12,360,996 B2
(45) Date of Patent: Jul. 15, 2025

(54) INFRASTRUCTURE FOR LIVE QUERIES

(71) Applicant: Apollo Graph, Inc., San Francisco, CA (US)

(72) Inventors: Ben Newman, Brooklyn, NY (US); Martijn Walraven, Amsterdam (NL); Sylvain Lebresne, Rennes (FR); Geoffroy Couprie, Nantes (FR); Phil Prasek, Seattle, WA (US)

( * ) Notice: Subject to any disclaimer, the term of this patent is extended or adjusted under 35 U.S.C. 154(b) by 0 days.

(21) Appl. No.: 18/477,358

(22) Filed: Sep. 28, 2023

(65) Prior Publication Data

US 2024/0111766 A1    Apr. 4, 2024

Related U.S. Application Data

(60) Provisional application No. 63/412,318, filed on Sep. 30, 2022.

(51) Int. Cl.
*G06F 17/00* (2019.01)
*G06F 16/2453* (2019.01)

(52) U.S. Cl.
CPC .............................. *G06F 16/24539* (2019.01)

(58) Field of Classification Search
CPC ........... G06F 16/24539; G06F 16/9024; G06F 16/9027
See application file for complete search history.

(56) References Cited

U.S. PATENT DOCUMENTS 11,093,497 B1\* 8/2021 Gupta ................. G06F 16/2343
2023/0138971 A1\* 5/2023 Krishnan ............ G06F 16/9024
                                                        707/797

FOREIGN PATENT DOCUMENTS

WO    WO2025058650 A3    3/2025

OTHER PUBLICATIONS

Kukjin Lee et al., Operator and Query Progress Estimation in Microsoft SQL Server Live Query Statistics. In Proceedings of the 2016 International Conference on Management of Data (SIGMOD '16). Association for Computing Machinery, 1753-1764, <ttps://doi.org/10.1145/2882903.2903728>, Jun. 2016.\*
International Search Report and Written Opinion, PCT Application No. PCT/US2023/075543, issued Mar. 7, 2025, 6 pages.

\* cited by examiner

*Primary Examiner* — Greta L Robinson
(74) *Attorney, Agent, or Firm* — Berkeley Law & Technology Group, LLP

(57)    ABSTRACT

The present disclosure relates generally to computing and/or communications infrastructure and, more particularly, infrastructure for live queries in graph routers.

20 Claims, 18 Drawing Sheets

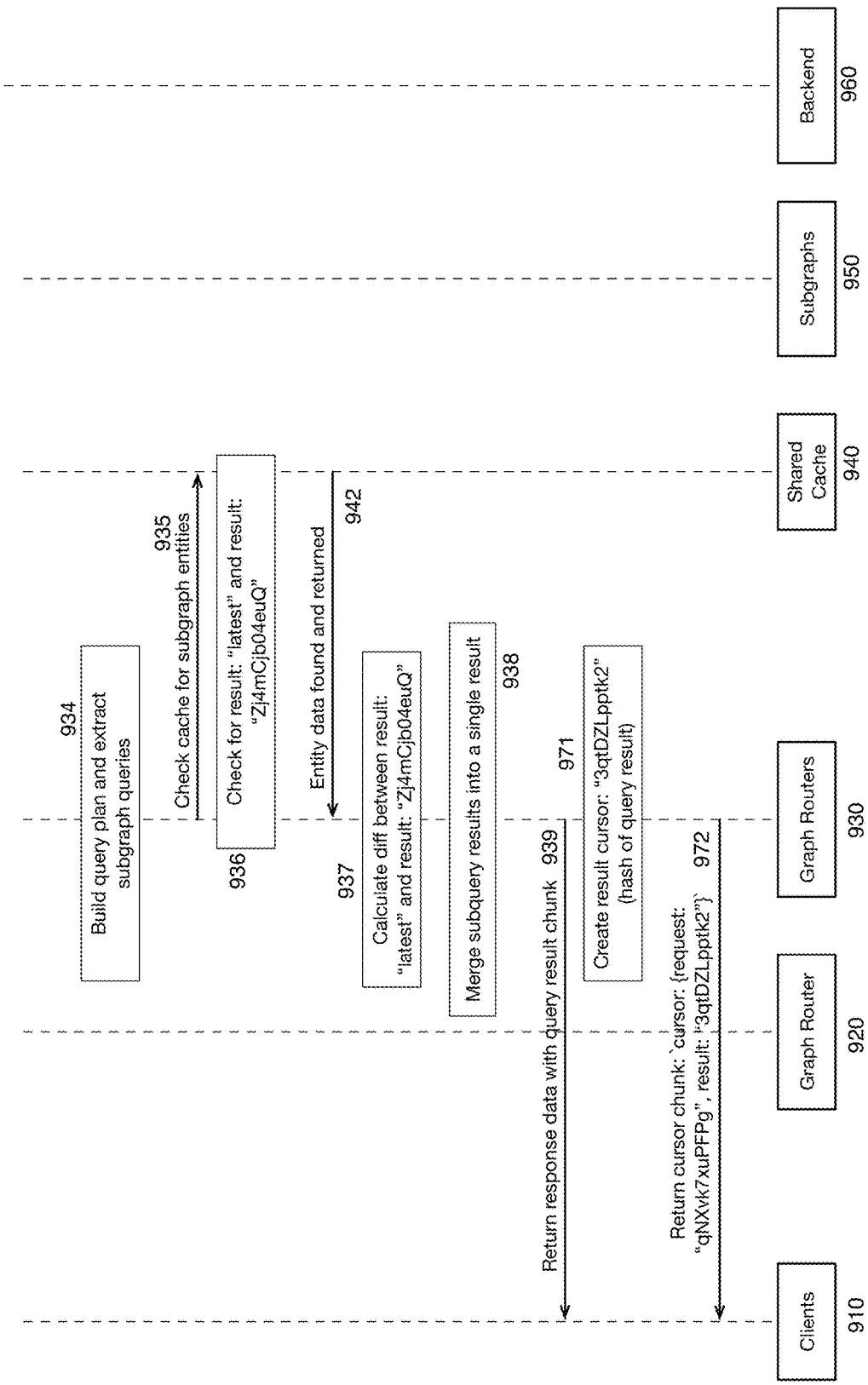

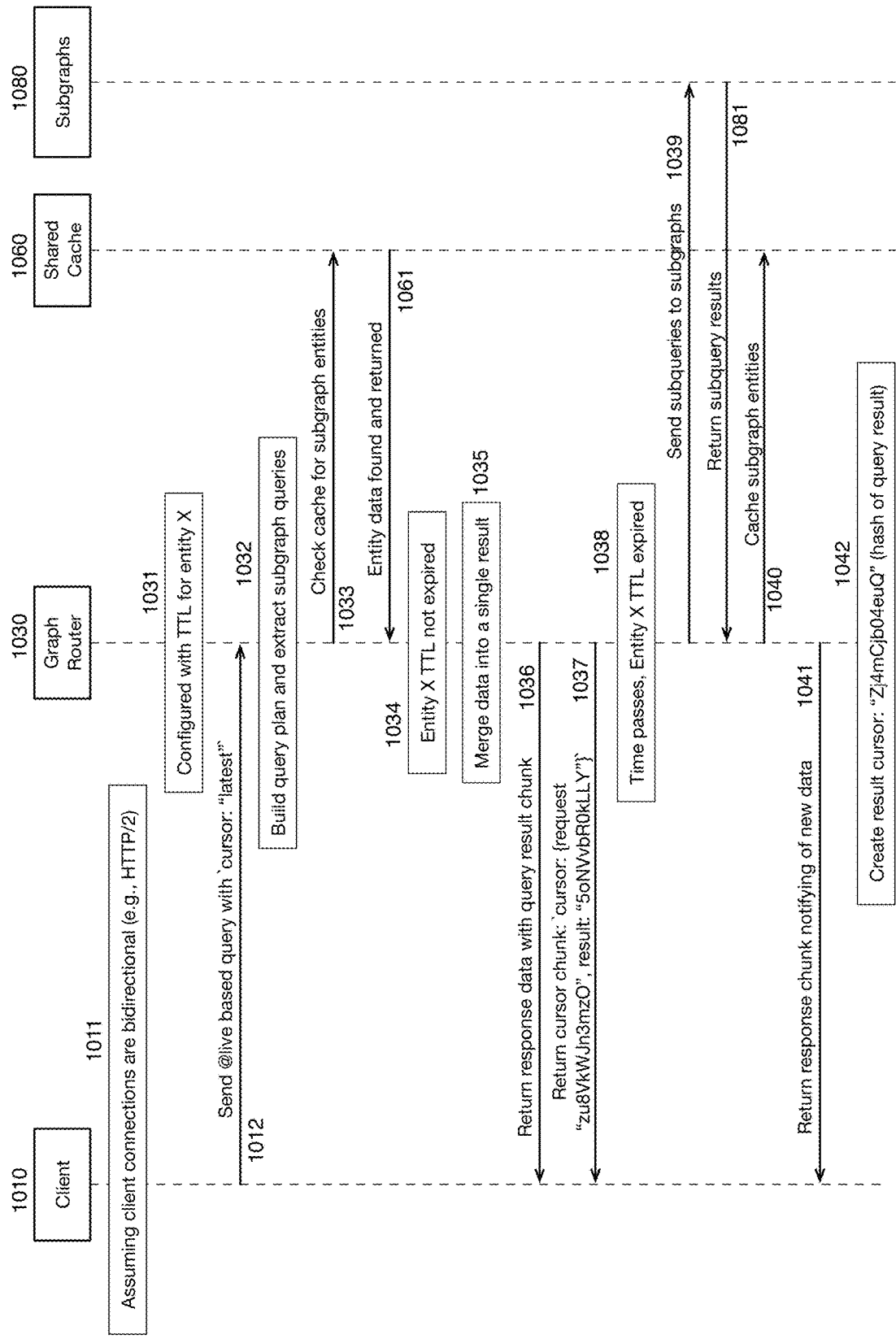

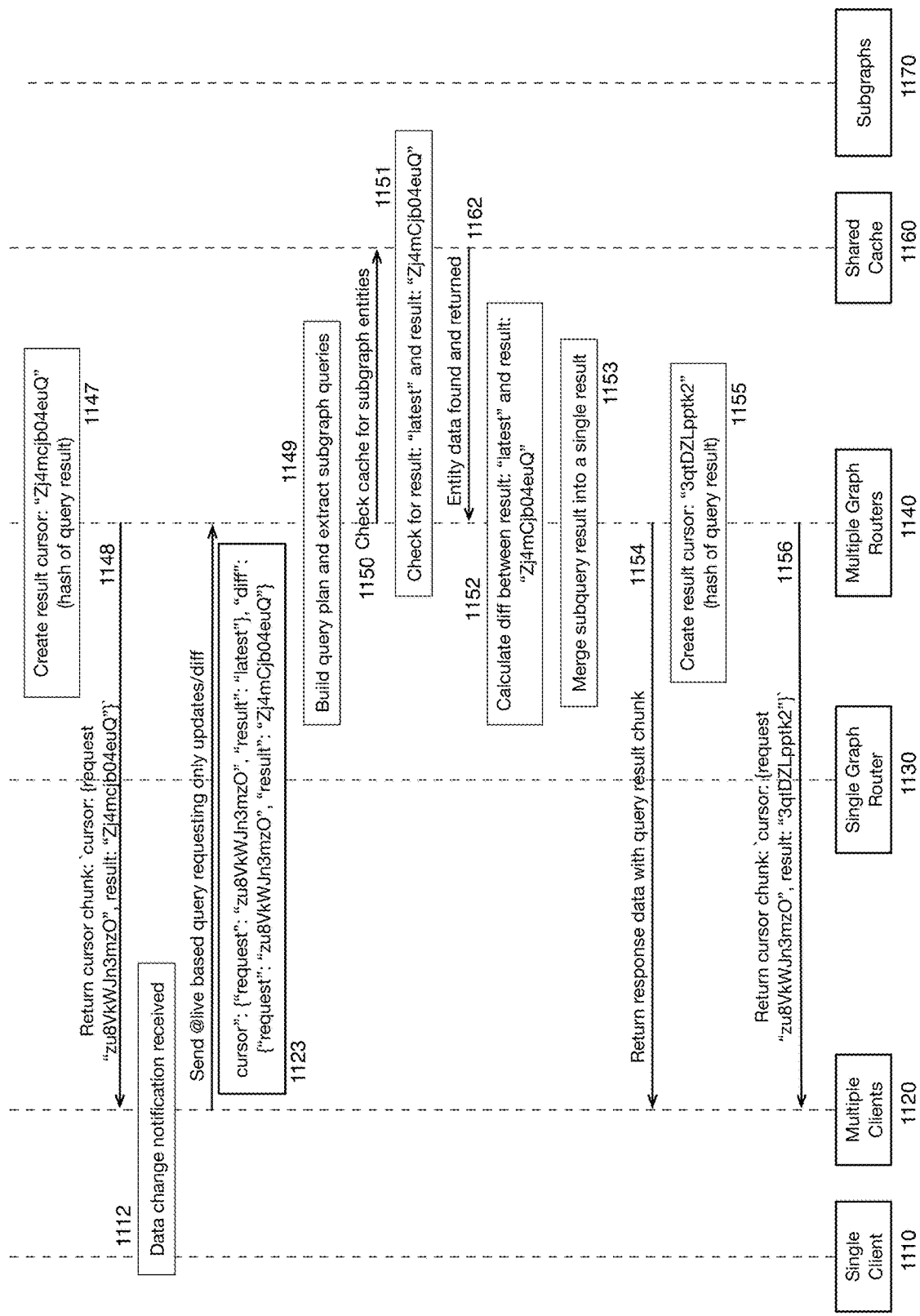

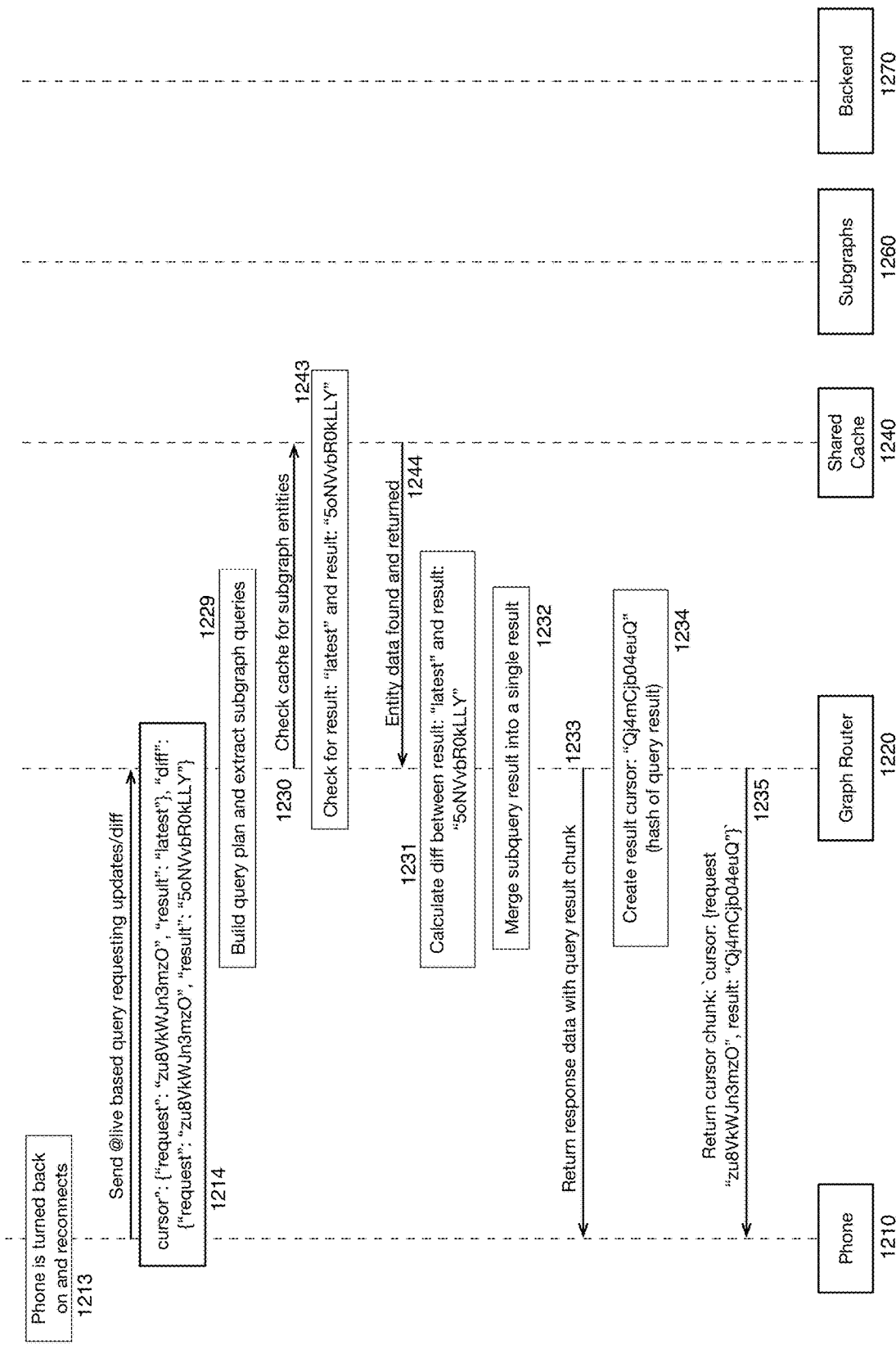

INFRASTRUCTURE FOR LIVE QUERIES

BACKGROUND

Field

The present disclosure relates generally to computing and/or communications infrastructure and, more particularly, infrastructure for live queries in graph routers.

Information

The Internet is widespread. The World Wide Web or simply the Web, provided by the Internet, is growing rapidly, at least in part, from the large amount of content being added seemingly on a daily basis. A wide variety of content in the form of stored signals, such as, for example, text files, images, audio files, video files, web pages, measurements of physical phenomena, and/or the like may be continually acquired, identified, located, retrieved, collected, stored, communicated, etc. Increasingly, content is being acquired, collected, communicated, etc. by a number of electronic devices, such as, for example, embedded computing devices leveraging existing Internet and/or like infrastructure as part of a so-called "Internet of Things" (IoT), such as via a variety of protocols, domains, and/or applications. IoT may typically comprise a system of interconnected and/or internetworked physical computing devices capable of being identified, such as uniquely via an assigned Internet Protocol (IP) address, for example. Devices, such as IoT-type devices, for example, may include computing resources embedded into hardware so as to facilitate and/or support a device's ability to acquire, collect, process and/or transmit content over one or more communications networks. IoT-type devices, for example, may comprise a wide variety of embedded devices, such as, for example, automobile sensors, biochip transponders, heart monitoring implants, thermostats, kitchen appliances, locks or like fastening devices, solar panel arrays, home gateways, controllers, and/or the like.

In some instances, challenges may be faced in improving performance of communications between and/or among IoT-type devices and/or other electronic device types, for example. An aspect of communications related to IoT-type devices and/or other electronic device types, for example, may involve processing of one or more queries that may be generated at IoT-type devices and/or other electronic device types.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIGS. 9a-9b depict a message flow diagram for an example live query process including historical shared caching of subgraph fetches and/or incremental delivery of @live query results, including incremental diff updates, in accordance with an embodiment.

FIGS. 10a-10b depict a message flow diagram for an example live query process including historical shared caching of subgraph fetches and/or incremental delivery of @live query results, including time-to-live support for cache entries, in accordance with an embodiment.

FIGS. 11a-11b depict a message flow diagram for an example live query process including multiple clients and/or multiple graph routers, in accordance with an embodiment.

FIGS. 12a-12b depict a message flow diagram for an example live query process including historical shared caching of subgraph fetches and/or incremental delivery of @live query results, including preservation of cursor state across dynamic re-connection of clients, in accordance with an embodiment.

Figure 1:
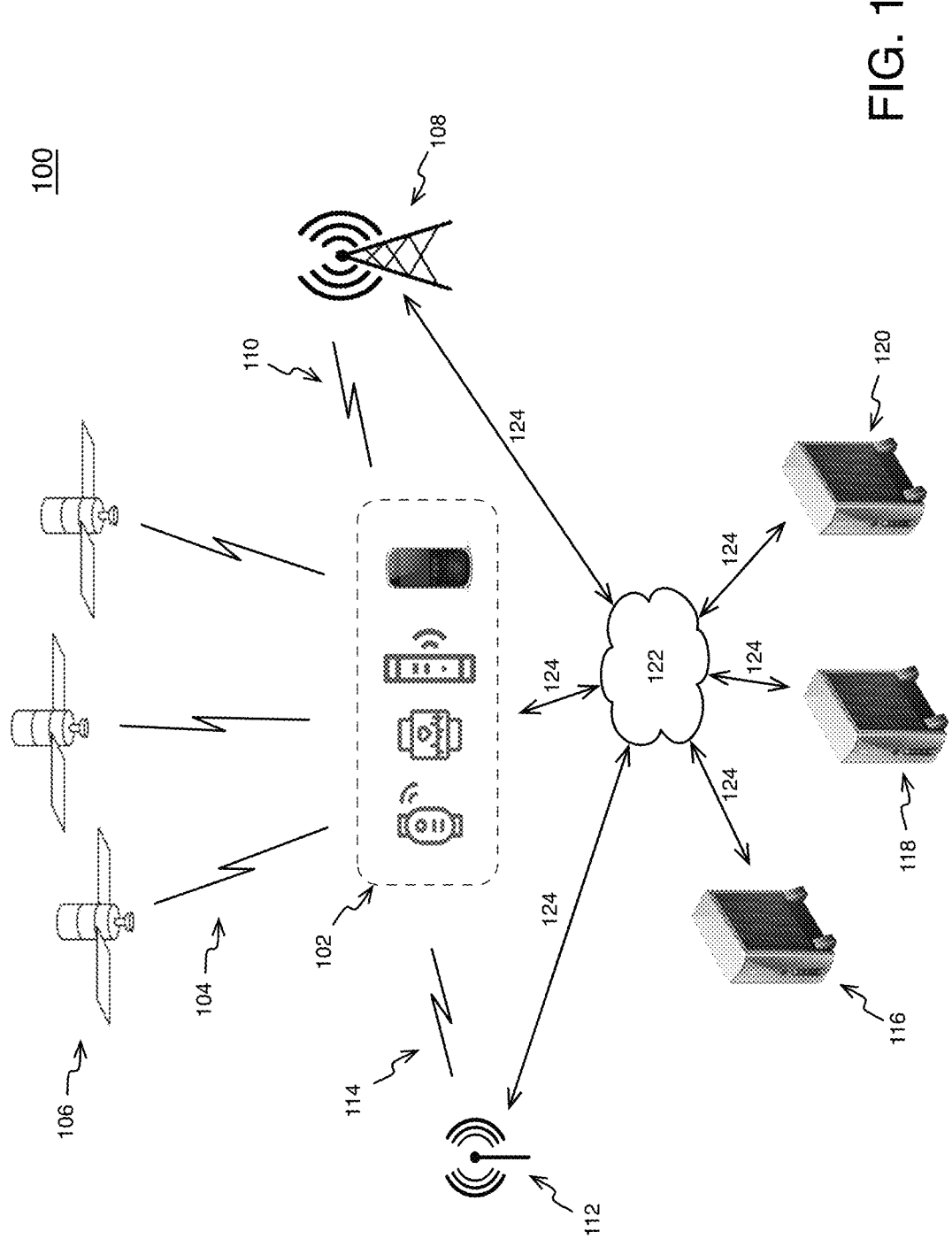
FIG. 1 is a schematic block diagram depicting an embodiment of an example system including one or more server computing devices and/or one or more IoT-type devices.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As mentioned above, the World Wide Web or simply the Web, provided by the Internet, is growing rapidly, at least in part, from the large amount of content being added seemingly on a daily basis. A wide variety of content in the form of stored signals, such as, for example, text files, images, audio files, video files, web pages, measurements of physical phenomena, and/or the like may be continually acquired, identified, located, retrieved, collected, stored, communicated, etc. Increasingly, content is being acquired, collected, communicated, etc. by a number of electronic devices, such as, for example, embedded computing devices leveraging existing Internet and/or like infrastructure as part of a so-called "Internet of Things" (IoT), such as via a variety of protocols, domains, and/or applications. IoT may typically comprise a system of interconnected and/or internetworked physical computing devices capable of being identified, such as uniquely via an assigned Internet Protocol (IP) address, for example. Devices, such as IoT-type devices, for example, may include computing resources embedded into hardware so as to facilitate and/or support a device's ability to acquire, collect, process and/or transmit content over one or more communications networks. In this context, "IoT-type devices" and/or the like refer to one or more electronic and/or computing devices capable of leveraging existing Internet and/or like infrastructure as part of the IoT, such as via a variety of applicable protocols, domains, applications, etc. In particular implementations, IoT-type devices, for example, may comprise a wide variety of embedded devices, such as, for example, automobile sensors, biochip transponders, heart monitoring implants, thermostats, kitchen appliances, locks or like fastening devices, solar panel arrays, home gateways, controllers, and/or the like. Although embodiments described herein may refer to IoT-type devices, claimed subject matter is not limited in scope in these respects. For example, although IoT-type devices may be described, claimed subject matter is intended to include use of any of a wide range of electronic device types, including a wide range of computing device types.

In some instances, challenges may be faced in improving performance of communications between and/or among IoT-type devices and/or other electronic device types, for example. An aspect of communications related to IoT-type devices and/or other electronic device types, for example, may involve processing of one or more queries that may be generated at IoT-type devices and/or other electronic device types.

"Electronic content," "content" and/or the like as the terms are used herein should be interpreted broadly and refers to signals, such signal packets, for example, and/or states, such as physical states on a memory device, for example, but otherwise are employed in a manner irrespective of format, such as any expression, representation, realization, and/or communication, for example. Content may comprise, for example, any information, knowledge, and/or experience, such as, again, in the form of signals and/or states, physical or otherwise. In this context, "electronic" or "on-line" content refers to content in a form that although not necessarily capable of being perceived by a human, (e.g., via human senses, etc.) may nonetheless be transformed into a form capable of being so perceived, such as visually, haptically, and/or audibly, for example. Non-limiting examples may include text, audio, images, video, security parameters, combinations, or the like. Thus, content may be stored and/or transmitted electronically, such as before or after being perceived by human senses. In general, it may be understood that electronic content may be intended to be referenced in a particular discussion, although in the particular context, the term "content" may be employed for ease of discussion. Specific examples of content may include, for example, computer code, data, metadata, message, text, audio file, video file, data file, web page, or the like. Claimed subject matter is not intended to be limited to these particular examples, of course.

FIG. 1 is a schematic diagram illustrating features associated with an implementation of an example operating environment 100 capable of facilitating and/or supporting one or more operations and/or techniques for infrastructure for updating and/or managing IoT-type devices, illustrated generally herein at 102. As was indicated, the IoT is typically a system of interconnected and/or internetworked physical devices in which computing may be embedded into hardware so as to facilitate and/or support devices' abilities to acquire, collect and/or communicate content over one or more communications networks, for example, at times, without human participation and/or interaction. As mentioned, IoT-type devices may include a wide variety of stationary and/or mobile devices, such as, for example, automobile sensors, biochip transponders, heart monitoring implants, kitchen appliances, locks or like fastening devices, solar panel arrays, home gateways, smart gauges, smart telephones, cellular telephones, security cameras, wearable devices, thermostats, Global Positioning System (GPS) transceivers, personal digital assistants (PDAs), virtual assistants, laptop computers, personal entertainment systems, tablet personal computers (PCs), PCs, personal audio and/or video devices, personal navigation devices, and/or the like.

It should be appreciated that operating environment 100 is described herein as a non-limiting example that may be implemented, in whole or in part, in a context of various wired and/or wireless communications networks and/or any suitable portion and/or combination of such networks. For example, these or like networks may include one or more public networks (e.g., the Internet, the World Wide Web), private networks (e.g., intranets), wireless wide area networks (WWAN), wireless local area networks (WLAN, etc.), wireless personal area networks (WPAN), telephone networks, cable television networks, Internet access networks, fiber-optic communication networks, waveguide communication networks and/or the like. It should also be noted that claimed subject matter is not limited to a particular network and/or operating environment. Thus, for a particular implementation, one or more operations and/or techniques for updating and/or managing IoT-type devices may be performed, at least in part, in an indoor environment and/or an outdoor environment, or any combination thereof.

Thus, as illustrated, in a particular implementation, one or more IoT-type devices 102 may, for example, receive and/or acquire satellite positioning system (SPS) signals 104 from SPS satellites 106. In some instances, SPS satellites 106 may be from a single global navigation satellite system (GNSS), such as the GPS or Galileo satellite systems, for example. In other instances, SPS satellites 106 may be from multiple GNSS such as, but not limited to, GPS, Galileo, Glonass, or Beidou (Compass) satellite systems, for example. In certain implementations, SPS satellites 1006 may be from any one several regional navigation satellite systems (RNSS) such as, for example, WAAS, EGNOS, QZSS, just to name a few examples.

At times, one or more IoT-type devices 102 may, for example, transmit wireless signals to and/or receive wireless signals from a suitable wireless communication network. In one example, one or more IoT-type devices 102 may communicate with a cellular communication network, such as by transmitting wireless signals to and/or receiving wireless signals from one or more wireless transmitters capable of transmitting and/or receiving wireless signals, such as a base station transceiver 108 over a wireless communication link 110, for example. Similarly, one or more IoT-type devices 102 may transmit wireless signals to and/or receive wireless signals from a local transceiver 112 over a wireless communication link 114, for example. Base station transceiver 108, local transceiver 112, etc. may be of the same or similar type, for example, and/or may represent different types of devices, such as access points, radio beacons, cellular base stations, femtocells, an access transceiver device, or the like, depending on an implementation. Similarly, local transceiver 112 may comprise, for example, a wireless transmitter and/or receiver capable of transmitting and/or receiving wireless signals. For example, at times, wireless transceiver 112 may be capable of transmitting and/or receiving wireless signals from one or more other terrestrial transmitters and/or receivers.

In a particular implementation, local transceiver 112 may, for example, be capable of communicating with one or more IoT-type devices 102 at a shorter range over wireless communication link 114 than at a range established via base station transceiver 108 over wireless communication link 110. For example, local transceiver 112 may be positioned in an indoor or like environment and/or may provide access to a wireless local area network (WLAN, e.g., IEEE Std. 802.11 network, etc.) and/or wireless personal area network (WPAN, e.g., Bluetooth® network, etc.). In another example implementation, local transceiver 112 may comprise a femtocell and/or picocell capable of facilitating communication via link 114 according to an applicable cellular or like wireless communication protocol. Again, it should be understood that these are merely examples of networks that may communicate with one or more IoT-type devices 102 over a wireless link, and claimed subject matter is not limited in this respect. For example, in some instances, operating environment 100 may include a larger number of base station transceivers 108, local transceivers 112, networks, terrestrial transmitters and/or receivers, etc.

In an implementation, one or more IoT-type devices 102, base station transceiver 108, local transceiver 112, etc. may, for example, communicate with one or more servers, referenced herein at 116, 118, and 120, over a network 122, such as via one or more communication links 124. Network 122 may comprise, for example, any combination of wired and/or wireless communication links. In a particular implementation, network 122 may comprise, for example, Internet Protocol (IP)-type infrastructure capable of facilitating or supporting communication between one or more IoT-type devices 102 and one or more servers 116, 118, 120, etc. via local transceiver 112, base station transceiver 108, directly, etc. In another implementation, network 122 may comprise, for example cellular communication network infrastructure, such as a base station controller and/or master switching center to facilitate and/or support mobile cellular communication with one or more IoT-type devices 102. Servers 116, 118 and/or 120 may comprise any suitable servers or combination thereof capable of facilitating or supporting one or more operations and/or techniques discussed herein. For example, servers 116, 118 and/or 120 may comprise one or more update servers, back-end servers, management servers, archive servers, location servers, positioning assistance servers, navigation servers, map servers, crowdsourcing servers, network-related servers, or the like.

Even though a certain number of computing platforms and/or devices are illustrated herein, any number of suitable computing platforms and/or devices may be implemented to facilitate and/or support one or more techniques and/or processes associated with operating environment 100. For example, at times, network 122 may be coupled to one or more wired and/or wireless communication networks (e.g., WLAN, etc.) so as to enhance a coverage area for communications with one or more IoT-type devices 102, one or more base station transceivers 108, local transceiver 112, servers 116, 118, 120, or the like. In some instances, network 122 may facilitate and/or support femtocell-based operative regions of coverage, for example. Again, these are merely example implementations, and claimed subject matter is not limited in this regard.

In this context, "IoT-type devices" refer to one or more electronic and/or computing devices capable of leveraging existing Internet or like infrastructure as part of the so-called "Internet of Things" or IoT, such as via a variety of applicable protocols, domains, applications, etc. As was indicated, the IoT is typically a system of interconnected and/or internetworked physical devices in which computing may be embedded into hardware so as to facilitate and/or support devices' ability to acquire, collect, and/or communicate content over one or more communications networks, for example, at times, without human participation and/or interaction. IoT-type devices 102, for example, may include a wide variety of stationary and/or mobile devices, such as, for example, automobile sensors, biochip transponders, heart monitoring implants, kitchen appliances, locks or like fastening devices, solar panel arrays, home gateways, smart gauges, smart telephones, cellular telephones, security cameras, wearable devices, thermostats, Global Positioning System (GPS) transceivers, personal digital assistants (PDAs), virtual assistants, laptop computers, personal entertainment systems, tablet personal computers (PCs), PCs, personal audio or video devices, personal navigation devices, and/or the like, to name a few non-limiting examples. Typically, in this context, a "mobile device" refers to an electronic and/or computing device that may from time to time have a position or location that changes, and/or a stationary device refers to a device that may have a position or location that generally does not change. In some instances, IoT-type devices, such as IoT-type devices 102, may be capable of being identified, such as uniquely, via an assigned Internet Protocol (IP) address, as one particular example, and/or having an ability to communicate, such as receive and/or transmit electronic content, for example, over one or more wired and/or wireless communications networks.

Figure 2:
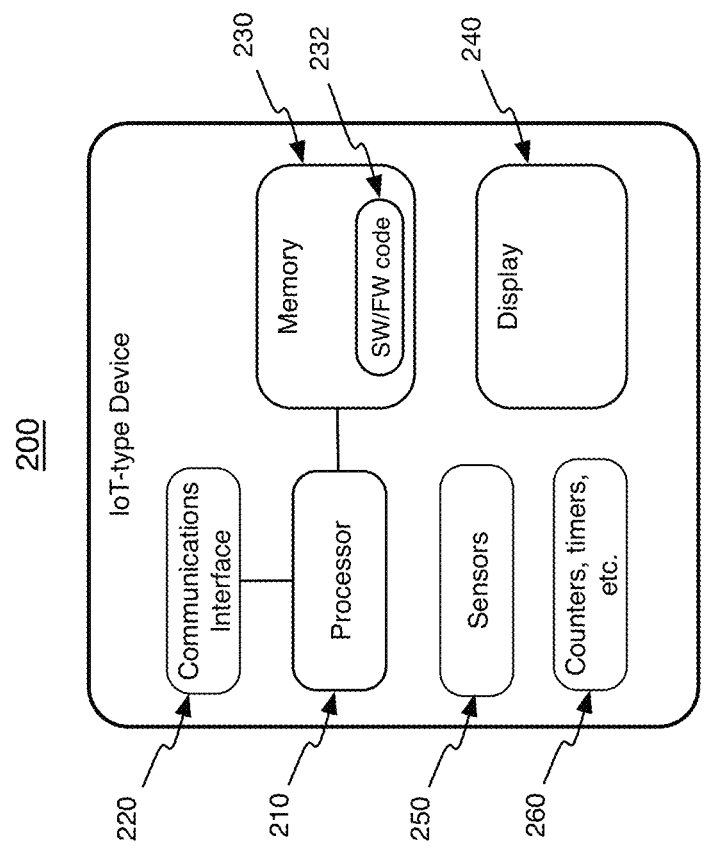
FIG. 2 is a schematic block diagram depicting an embodiment of an example Internet of Things (IoT) type device.

FIG. 2 is an illustration of an embodiment 200 of an example particular IoT device. Of course, claimed subject matter is not limited in scope to the particular configurations and/or arrangements of components depicted and/or described for example devices mentioned herein. In an embodiment, an IoT-type device, such as 200, may comprise one or more processors, such as processor 210, and/or may comprise one or more communications interfaces, such as communications interface 220. In an embodiment, one or more communications interfaces, such as communications interface 220, may enable wireless communications between an electronic device, such as an IoT-type device 200, and one or more other computing devices. In an embodiment, wireless communications may occur substantially in accordance any of a wide range of communication protocols, such as those mentioned herein, for example.

In a particular implementation, an IoT-type device, such as IoT-type device 200, may include a memory, such as memory 230. In a particular implementation, memory 230 may comprise a non-volatile memory, for example. Further, in a particular implementation, a memory, such as memory 230, may have stored therein executable instructions, such as for one or more operating systems, communications protocols, and/or applications, for example. A memory, such as 230, may further store particular instructions, such as software and/or firmware code 232, that may be updated via one or more example implementations and/or embodiments described herein. Further, in a particular implementation, an IoT-type device, such as IoT-type device 200, may comprise a display, such as display 240, and/or one or more sensors, such as one or more sensors 250. As utilized herein, "sensors" and/or the like refer to a device and/or component that may respond to physical stimulus, such as, for example, heat, light, sound pressure, magnetism, particular motions, etc., and/or that may generate one or more signals and/or states in response to physical stimulus. Example sensors may include, but are not limited to, one or more accelerometers, gyroscopes, thermometers, magnetometers, barometers, light sensors, proximity sensors, heart-rate monitors, perspiration sensors, hydration sensors, breath sensors, cameras, microphones, etc., and/or any combination thereof.

In particular implementations, IoT-type device 200 may include one or more timers and/or counters and/or like circuits, such as circuitry 260, for example. In an embodiment, one or more timers and/or counters and/or the like may track one or more aspects of device performance and/or operation. For example, timers, counters, and/or other like circuits may be utilized, at least in part, by IoT-type device 200 to determine measures of fitness, for example, and/or to otherwise generate feedback content related to testing results, in particular implementations.

Although FIG. 2 depicts a particular example implementation of an IoT-type device, such as IoT-type device 200, other embodiments may include other types of electronic and/or computing devices. Example types of electronic and/or computing devices may include, for example, any of a wide range of digital electronic devices, including, but not limited to, desktop and/or notebook computers, high-definition televisions, digital video players and/or recorders, game consoles, satellite television receivers, cellular telephones, tablet devices, wearable devices, personal digital assistants, mobile audio and/or video playback and/or recording devices, or any combination of the foregoing.

In an embodiment, a client computing device (e.g., via execution of an application), such as IoT-type device 200, may generate one or more queries, such as a query that may include a content request. A variety of query languages may exist to formulate queries for specific content being sought. Examples of query languages may include Structured Query Language (SQL), XML Path Language (XPATH), and/or GraphQL, but these are just illustrative examples. The term Structured Query Language, SQL, and/or similar terms are intended to refer to any version, now known and/or to be later developed of the Structured Query Language. Similarly, the term XML Path Language, XPATH, and/or similar terms are intended to refer to any version, now known and/or to be later developed, of the XML Path Language. Likewise, the term GraphQL, and/or similar terms are intended to refer to any version, now known and/or to be later developed, of the GraphQL query language. Furthermore, as used herein, the terms query, query request, queries and/or the like are intended to refer to one or more queries formulated in a particular query language, such as one of the foregoing languages, for example. Also, although embodiments and/or implementations described herein may refer to queries, other embodiments and/or implementations may include other types of operations such as mutations, for example.

In embodiments, GraphQL may comprise a query language for an application programming interface (API) and/or a server-side runtime service for executing queries using a type system and/or the like that may be defined for content to be sought. In particular implementations, GraphQL may not be tied to any specific database and/or storage engine and/or may instead be backed by existing code and/or content.

A GraphQL schema, for example, may comprise a specification of a set of content types and/or structures, levels of nesting, and/or fields, etc., for example, which may indicate content available, such as to be queried. Similarly, a GraphQL query path may specify that for certain content fields a path may be followed and/or traversed to locate such content, such as in a repository. A GraphQL query shape likewise may specify relationships within a GraphQL schema, such as for content types, etc., including interrelationships, nesting and/or other forms of association, for example.

As utilized herein, "graph" and/or the like represents a structure that may include points connected by edges, for example. Additionally, "data graph" and/or the like represents a model of content (e.g., data) available from a service structured as a graph. In an implementation, a graph may have a number of properties. For example, in an implementation, a graph may comprise "points" and/or the like that may represent objects and/or properties. Points may optionally contain binary or textual data, for example. Graphs may also include "edges" and/or the like that may represent relationships, for example. Also, in implementations, graphs may include queries that may terminate at certain points and/or that may change a graph in accordance with the following: a) queries may add or remove points; b) queries may add or remove edges connecting points; and/or c) queries may add, remove, or modify the data attached to points, for example. In implementations, one or more points may be tagged as roots for different categories of queries. For example, a query root may be provided such that queries that begin at a query root provide, but do not modify, graph content. In an implementation, a separate mutation root may be identified such that queries that begin at the mutation root may both modify and read graph data, for example.

As utilized herein, a "graph schema" and/or the like represents a description of an expected structure of a data graph. In an implementation, rather than enumerate points and edges (e.g., a representation that may be as large or even frequently much larger than content to be sought itself), a graph schema may provide a type system for the data graph with various example properties. For example, a graph schema may assign a "type" to points (e.g., every point in particular implementations) within a data graph. In implementations, a schema may specify constraints some point p may satisfy to be included within a type, including but not limited to: a) presence of one or more edges fulfilling arbitrary criteria beginning at p; and b) presence and/or shape of content contained by a point, for example. Further, for example, a graph schema may assign a "field" to edges (e.g., every edge in particular implementations) within a data graph. For example, fields may comprise a generalization over edges. In implementations, whereas an edge may describe a connection between specific objects in a data graph, fields may describe a connection between types. That is, fields may represent a class of relationship that may be represented between objects, for example. Also, in implementations, fields may be parameterized to represent a wider range of relationships. For example, a schema may define a User.friends(first: Int)→[User] field, which may connect a user to a list of their friends, limited in size to the specified number of friends. This example field may represent an unbounded number of edges, including "user A's first friend on the service", "user A's first two friends", "user A's first three friends", etc.

In implementations, a graph schema may define a "type graph" that may represent relationships between types. For example, within a type graph, points may comprise types and/or edges that may comprise "casts" representing relationships that types may have with each other. In a particular implementation, given two types A and B, the following relationships are possible: a) A may comprise a proper superset of B if all points within B also fall within A. In this case, B may have an unconditional edge to A and A may have a conditional edge to B; b) A may overlap with B if some but not all points within B are in A and some but not all points within A are in B. In this case, A and B may have conditional edges to each other; and/or c) A and B may be non-overlapping if there exist no points which are shared between them. In this case, no edges will exist between A and B. In implementations, there may exist a number of possible textual representations (e.g., encodings) of a graph schema, for example.

In implementations, a GraphQL service may be generated at least in part by defining types and/or fields on those types. For example, a GraphQL service that may indicate an identity of a logged-in user is (e.g., "me") as well as that logged-in user's name might look like the following:

```
type Query {
  me: User
}
type User {
  id: ID
  name: String
}
```

In implementations, once running (e.g., at a URL on a web service) a GraphQL service (e.g., endpoint) may receive GraphQL queries to validate and/or execute. A GraphQL service may first check a query to ensure it refers to the types and/or fields defined and then may run specified functions to produce a result. For example, a query:

```
{
  me {
    name
  }
}
``` may generate the following JSON result, for example:

```
{
  "me": {
    "name": "Luke Skywalker"
  }
}
```

In implementations, an example GraphQL query language may relate at least in part to selecting fields on objects.

```
{
  hero {
    name
    appearsIn
  }
}
{
  "data": {
    "hero": {
      "name": "R2-D2",
      "appearsIn": [
        "NEWHOPE",
        "EMPIRE",
        "JEDI"
      ]
    }
  }
}
```

For the example query shown above, processing may begin with a special "root" object. Subsequently, the "hero" field may be selected, for example. For the object returned by "hero," the "name" and "appearsIn" fields may be selected, for example.

In at least some circumstances, it may be advantageous and/or beneficial to have a more exact description of the content (e.g., data) one may ask for—what fields can one select? What kinds of objects might the fields return? What fields are available on those sub-objects? In implementations, a schema, such as a GraphQL schema, may help provide the aforementioned advantages and/or benefits, as explained more fully below.

In implementations, a schema, such as a GraphQL schema, may define a set of types which may describe (e.g., may completely describe in particular implementations) a set of possible content one may access on a particular service. In an implementation, responsive at least in part to receiving one or more queries, the one or more queries may be validated and/or executed against the particular schema, for example.

In implementations, GraphQL services may be written in any language. Because one may not rely on a specific programming language syntax, like JavaScript, to discuss GraphQL schemas, an example GraphQL schema language, similar in at least some respects to a GraphQL query language, may be utilized herein for various examples to allow language-agnostic discussion of schemas, such as GraphQL schemas. Although example embodiments and/or implementations may be described herein, at least in part, in connection with GraphQL, subject matter is not limited in scope in this respect. That is, GraphQL is utilized herein as a non-limiting example.

In implementations, basic components of a GraphQL schema may comprise object types, which may represent a kind of object that may be fetched from a service, and what fields the object types may have. In an example GraphQL schema language, an example object type may be represented as follows:

```
type Character {
    name: String!
    appearsIn: [Episode!]!
}
```

For the example above, "Character" may comprise a GraphQL Object Type, meaning it's a type with some fields. Many, or most, of the types in a schema may comprise object types, for example. Also, for example, "name" and "appearsIn" may comprise fields on the Character type. For example, name and appearsIn may comprise fields that may appear in a part of a GraphQL query that operates on the Character type. "String," for example, may comprise one of the built-in scalar types. Scalar types may resolve to a single scalar object and may not have sub-selections in a query, for example. Further, "String!" may specify that a field is non-nullable, meaning that the GraphQL service may always provide a value when this field is queried. In the example type language, non-nullable fields may be represented as those with an exclamation mark. Additionally, [Episode!]! may represents an array of Episode objects. Because it may also be non-nullable, one may expect an array (e.g., with zero or more items) in response to the appearsIn field being queried. Also, because Episode! may also be non-nullable, one may expect individual items of the array to be Episode objects, for example.

The above discussion may provide some understanding of what an example GraphQL object type may look like and/or may also provide some understanding of how to read some basics of an example GraphQL-type language. In implementations, an organization may advantageously expose a single graph that may provide a unified interface for querying various combinations of content sources. However, it may be challenging to represent an enterprise-scale graph with a single, monolithic GraphQL service, for example.

To address this challenge, at least in part, a federated approach may be utilized to divide a graph implementation into multiple services that may be maintained more easily by different teams. An example architecture utilizing a federated approach may include, for example, a collection of subgraphs (e.g., usually represented as different API services) that may individually define a particular GraphQL schema. For example, multiple GraphQL subgraphs may be declaratively composed to create a unified set of types in a unified supergraph schema. Further, for example, a graph router may utilize the declaratively composed unified supergraph schema (e.g., composed from multiple GraphQL subgraph schemas) to execute operations, such as queries, for example, across the multiple GraphQL subgraphs to provide clients access to all of the types and fields in the composed supergraph.

Figure 3:
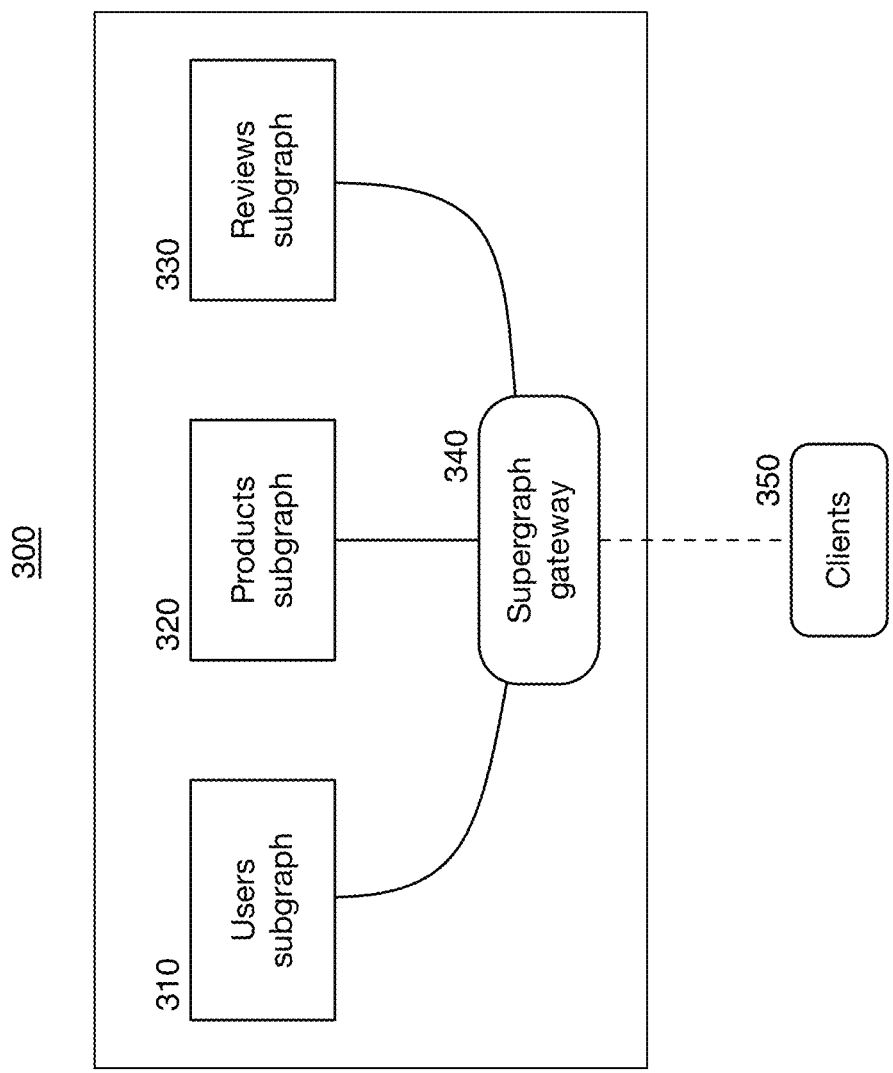
FIG. 3 depicts an example graph implemented across multiple API services.

For example, as depicted in FIG. 3, a graph (e.g., supergraph), such as supergraph 300, may have its implementations spread across multiple API services including, for example, a first subgraph, such as "Users" subgraph 310, a second subgraph, such as "Products" subgraph 320, and/or a third subgraph, such as "Reviews" subgraph 330. Subgraphs 310, 320 and/or 330, for example, may be composed into supergraph 300. By querying supergraph 300, one or more client computing devices or clients 350 may query any or all of subgraphs 310, 320 and/or 330 at the same time, for example. In an implementation, a graph router, such as graph router 340, may serve as an access point for a supergraph, such as supergraph 300. In an implementation, a graph router, such as graph router 340, may receive incoming GraphQL operations (e.g., queries) and/or may intelligently distribute the incoming GraphQL operations across subgraphs, such as subgraphs 310, 320 and/or 330. From the perspective of clients 350, querying subgraphs via graph router 340 may look the same as querying any other GraphQL server (e.g., no special configuration may be needed), for example.

Unlike other distributed GraphQL architectures such as, for example, schema stitching, a federated approach may utilize a declarative composition model that may enable individual subgraphs to implement a specified part of a composed supergraph for which the individual subgraphs may be responsible. Unlike schema stitching, which may require manually authored imperative code in Javascript (a specific programming language) to stitch schemas together at runtime, for example, a federated approach may declaratively compose subgraph schemas into a single unified supergraph schema, validate a single supergraph schema at build-time for correctness, for example, and/or may load the supergraph schema into a federated GraphQL runtime like a graph router to serve client queries and perform other GraphQL operations at runtime. Unlike schema stitching, a federated approach may use GraphQL schema to describe the modular subgraph schemas that will be composed, which is independent of the programming language used to build a subgraph server. As such, a declarative, federated approach to composing subgraph schemas into a unified supergraph schema may be agnostic to the programming language used to author the GraphQL server, unlike schema stitching which may be tied to Javascript, a specific programming language. A federated approach may also enable one to add, remove, and/or refactor subgraphs without incurring downtime for production graphs, for example.

Unlike other data access approaches, for example databases which also use schemas and/or may have a query planner to execute queries, a federated GraphQL architecture may use GraphQL instead of SQL to define data structures and queries and/or may access GraphQL subgraphs on a network instead of database tables on disk. Also, a federated GraphQL approach may not in at least some circumstances offer a durable and/or persistent store of data itself, but rather may be layered on top of underlying network services (e.g., GraphQL APIs, REST APIs, and/or microservices) that may in turn use a database or other data store. Relational databases may be built with multiple tables that may refer to each other. For example, rows from one table may refer to specific rows in another table which may be connected by some ID column(s). One may SELECT fields FROM multiple database tables and join them together using keys or IDs that match a WHERE clause. In this way, one may spread the data for an entity across multiple database tables and/or may join them together using a SQL query that may then be processed by a database query planning engine to create a query plan, execute it by fetching data from the underlying database tables on disk and/or collate and return the results to the client. In a similar way, a federated approach may allow one to spread the implementation of entity types in a graph across multiple subgraphs where a graph router can process a query and/or join entity fields together by dynamically creating a query plan at runtime to advantageously (e.g., optimally) fetch the entity fields from the respective subgraph API servers using entity keys. A federated GraphQL approach may be agnostic to the underlying database or microservice technologies used and may be used to create a unified graph layer on top of multiple underlying microservices (e.g., REST APIs, gRPC, etc.) that may in turn each use different database technologies. A federated approach may provide a single GraphQL schema that application developers may use to access data and services in an organization or across organizations on the public Internet, for example.

In federated GraphQL implementations, libraries may be provided to allow a server to act as a GraphQL subgraph and/or as a graph router, for example. Such components may be implemented in any language and/or framework.

In an implementation, a federated approach may be adopted incrementally. For example, for implementations using a monolithic GraphQL server, functionality may be converted to a federated approach one service at a time. Further, for example, for implementations using other architectures (e.g., schema stitching), support for a federated approach may be added to existing services one at a time. In such cases, clients may continue to work and/or may have no way to distinguish between different graph implementations. Thus, a federated approach may be adopted and/or implemented without adverse implications to clients, for example.

In implementations, a federated approach may encourage a design principle that may be referred to as "separation of concerns." Such a principle may enable different teams within an enterprise to work on different products and/or features within a single graph without interfering with each other.

When considering how to split a single GraphQL schema across multiple subgraphs, it may seem straightforward to divide schemas up by type. For example, a "users" subgraph may define a User type, a "products" subgraph may define a Product type, and so on:

```
Users subgraph:
type User {
  id: ID!
  name: String
  reviews: [Review]
  purchases: [Product]
}
Products subgraph:
type Product {
  id: ID!
  name : String
  price: String
  reviews: [Review]
}
Reviews subgraph:
type Review {
  id: ID!
  body: String
  author: User
  product: Product
}
```

Although this separation may appear relatively straightforward, it may pose issues. For example, a particular feature and/or concern may sometimes span multiple types. Consider, for example, the User.purchases field of the User type in the above schema. Even though this field is a member of the User type, a list of Products should probably be populated by the Products subgraph rather than the Users subgraph. In implementations, by defining the User.purchases field in the Products subgraph instead, the subgraph that defines the field may also be the subgraph that specifies how to populate the field. In some circumstances, the Users subgraph might not even have access to the content store that contains product content, for example. Also, by defining the User.purchases field in the Products subgraph, for example, the team that manages product content may contain product-related logic in a single subgraph for which they may be responsible.

The following example schema uses a federated approach to divide the same set of types and fields across the same three subgraphs (note: some federation-specific syntax is omitted here for clarity and/or ease of explanation):

```
Users subgraph
type User {
  id: ID!
  name: String
}
Products subgraph
type Product {
  id: ID!
  name : String
  price: String
}
type User {
  id: ID!
  purchases: [Product]
}
Reviews subgraph
type Review {
  id: ID!
  body: String
  author: User
  product: Product
}
type User {
  id: ID!
  reviews: [Review]
}
type Product {
  id: ID!
  reviews: [Review]
}
```

The difference is that now, individual subgraphs may define (e.g., may at least mostly define) types and/or fields that they are capable of, and/or may be responsible for, populating from their respective content stores, for example. The result may be the best of both worlds: an implementation that keeps code for a given feature in a single subgraph and separated from unrelated concerns and a product-centric schema with rich types that may reflect the way an application developer may want to consume the graph, for example.

Figure 4:
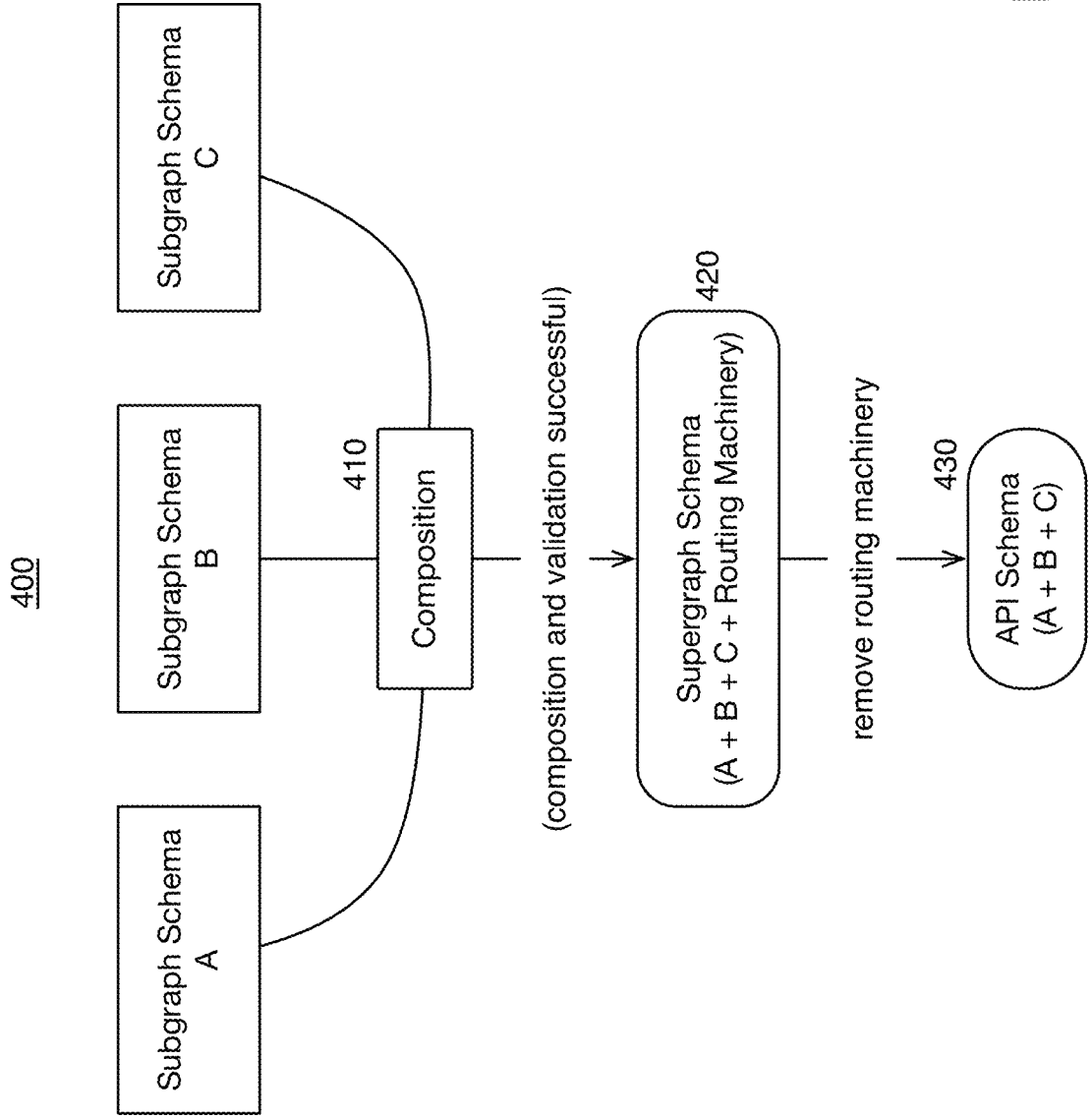
FIG. 4 is an illustration depicting an example federated graph.

FIG. 4 is an illustration depicting an example federated graph 400. In implementations, a federated graph, such as graph 400, may utilize multiple types of GraphQL schemas. For example, subgraphs schemas, such as subgraph schemas A, B, and/or C, may individually comprise distinct schemas that may indicate which types and/or fields that a composed supergraph schema, such as supergraph schema 420, may be responsible for resolving. A supergraph schema, such as supergraph schema 420, may comprise the result of performing composition, such as composition operation 410, on a collection of subgraph schemas, such as subgraph schemas A, B, and/or C. A supergraph schema may combine all of the types and/or fields from subgraph schemas plus some federation-specific directives that may instruct a graph router as to which subgraphs may be responsible for resolving particular fields, in implementations.

Additionally, an API schema, such as API schema 430, may resemble a supergraph schema, such as supergraph schema 420, in some respects, but it may omit types, fields, and/or directives that may be considered "machinery" and may not be part of a public API that GraphQL clients use directly. This may include federation-specific and/or user-defined directives, for example. An API schema, such as API schema 430, may be exposed in a graph router to a GraphQL API's consumers who may not need to know any internal implementation details about a particular graph, for example.

Consider an example. Below, schemas may be defined for three subgraphs in a basic example e-commerce application. Individual subgraphs may be implemented as a separate GraphQL API, for example:

```
Users subgraph
type Query {
  me: User
}
type User @key(fields: "id") {
  id: ID!
  username: String! @shareable
}
# (Subgraph schemas include
# this to opt in to
# Federation 2 features.)
extend schema
    @link(url: "https://specs.apollo.dev/federation/v2.0"
      import: ["@key", "@shareable"])
Products Subgraph
type Query {
  topProducts(first: Int = 5): [Product]
}
type Product @key(fields: "upc") {
  upc: String!
  name: String!
  price: Int
}
extend schema
@link(url: "https://specs.apollo.dev/federation/v2.0",
import: ["@key", "@shareable"])
Reviews subgraph
type Review {
  body: String
  author: User @provides(fields: "username")
  product: Product
}
type User @key(fields: "id") {
  id: ID!
  username: String! @external
  reviews: [Review]
}
type Product @key(fields: "upc") {
  upc: String!
  reviews: [Review]
}
# (This subgraph uses additional
# federated directives)
extend schema
@link(url: "https://specs.apollo.dev/federation/v2.0",
import: ["@key", "@shareable", "@provides", "@external"])
```

As the above example schemas show, multiple subgraphs may contribute unique fields to a single type. For example, the Products subgraph and the Reviews subgraph both contribute fields to the Product type.

In implementations, a supergraph schema, such as supergraph schema 800, may comprise the output of schema composition, such as schema composition operation 410 depicted in FIG. 4. In implementations, a supergraph schema may provide a graph router, such as graph router 340, with the name and endpoint URL for the individual subgraphs. A supergraph schema, such as supergraph schema 420, for example, may include types, fields and/or directives (e.g., all, most, etc. of the types, fields and/or directives) defined by the subgraph schemas, for example. Also, in an implementation, a supergraph schema may tell the graph router which of the subgraph schemas can resolve which GraphQL fields, for example. A supergraph schema example provided below represents an example result of a composition operation performed utilizing the example subgraph schemas provided above.

```
Supergraph Schema
@link(url: "https://specs.apollo.dev/link/v1.0")
@link(url: "https://specs.apollo.dev/join/v0.2", for: EXECUTION)
{
query: Query
}
directive @join__field(graph: join __Graph!, requires: join __FieldSet, provides:
join__FieldSet, type:
String, external: Boolean, override: String, usedOverridden: Boolean) repeatable on
    FIELD_DEFINITION | INPUT_FIELD_DEFINITION
directive @join__graph(name: String!, url: String!) on ENUM_VALUE
directive @join__implements(graph: join__Graph!, interface: String!) repeatable on
OBJECT |
INTERFACE
directive @join__type(graph: join__Graph!, key: join __FieldSet, extension: Boolean! =
false,
resolvable: Boolean! = true) repeatable on OBJECT | INTERFACE | UNION | ENUM |
INPUT_OBJECT | SCALAR
directive @link(url: String, as: String, for: link__Purpose, import: [link__Import]) repeatable
on
SCHEMA
scalar join__FieldSet
enum join__Graph {
PRODUCTS @join__graph(name: "products", url: "http://localhost:4003/graphql")
REVIEWS @join__graph(name: "reviews", url: "http:/localhost:4002/graphql")
USERS @join__graph(name: "users", url: "http://localhost:4001/graphql")
}
scalar link__Import
enum link__Purpose {
    """
    'SECURITY' features provide metadata necessary to securely resolve fields.
    """
    SECURITY
    """
    'EXECUTION' features provide metadata necessary for operation execution.
    """
    EXECUTION
```

```
}
type Product
@join__type(graph: PRODUCTS, key: "upc")
@join__type(graph: REVIEWS, key: "upc")
{
upc: String!
name: String! @join__field(graph: PRODUCTS)
price: Int @join__field(graph: PRODUCTS)
reviews: [Review] @join__field(graph: REVIEWS)
}
type Query
@join__type(graph: PRODUCTS)
@join__type(graph: REVIEWS)
@join__type(graph: USERS)
{
topProducts(first: Int = 5): [Product] @join__field(graph: PRODUCTS)
me: User @join__field(graph: USERS)
}
type Review
@join__type(graph: REVIEWS)
{
body: String
author: User @join__field(graph: REVIEWS, provides: "username")
product: Product
}
type User
@join__type(graph: REVIEWS, key: "id")
@join__type(graph: USERS, key: "id")
{
id: ID!
username: String! @join__field(graph: REVIEWS, external: true) @join__field(graph:
USERS)
reviews: [Review] @join__field(graph: REVIEWS)
}
```

In implementations, a graph router, such as graph router 340, may utilize a supergraph schema, such as supergraph schema 420, to generate a GraphQL API schema, such as API schema 430, that clients of the graph router may use to introspect the API schema (e.g., to browse the available types and/or root query fields), to issue GraphQL queries and/or to perform other GraphQL operations on the graph router. An API schema, such as the example API schema provided below, may represent the combination of the various subgraph schemas:

```
type Product {
name: String!
price: Int
reviews: [Review]
upc: String!
}
type Query {
me: User
topProducts(first: Int = 5): [Product]
}
type Review {
author: User
body: String
product: Product
}
type User {
id: ID!
reviews: [Review]
username: String!
}
```

As explained, an enterprise may have one unified graph (e.g., supergraph) as opposed to multiple graphs created by different teams, for example (of course, enterprises may utilize multiple unified supergraphs if they prefer and/or if advantageous). By having a unified graph, the value of GraphQL may be enhanced. More content and/or services may be accessed from a single query. For example, API-side joins may combine all of the fields for a particular entity, even if spread across multiple subgraphs, so that a single integrated result may be returned to the client. In this manner, the client need not stitch together the results, unlike other approaches that may batch individual requests to different subgraphs in a single query and then the client has to manually stitch these results together. API-side joins may be similar in at least some respects to database joins across tables, although with a GraphQL federated approach joins may be performed across multiple subgraphs instead of tables, for example. Having an ability to perform API-side joins rather than client-side joins may provide advantages in terms of runtime performance and/or in terms of simplifying and/or reducing work for application developers, for example. With a GraphQL federated approach, a unified graph may provide for a single source of truth for a number (e.g., all, most, etc.) services and/or may provide faster apps, quicker delivery, reduced maintenance overhead, etc. Also, for example, code, queries, skills and/or experience may be more portable across teams. A unified graph may also yield a central catalog of available content (e.g., schema registry) to which graph users may look, for example. Further, implementation costs may be reduced due at least in part to at least a good deal of graph implementation work not being duplicated across teams. Additionally, for example, central management of a graph may be unified across control policies. "Unified graph" and/or the like in this context refers to a graph composed from one or more graphs, such as subgraphs. "Supergraph" and/or the like refers to an example unified graph composed from one or more subgraphs. "Unified graph" and/or the like and "supergraph" and/or the like may be utilized herein interchangeably.

In implementations, although there may only be a single graph, implementation of that graph may be federated across multiple teams within an enterprise. For example, monolithic architectures may be difficult to scale without specialized infrastructure and/or without significant negative impact to productivity (e.g., due to various teams having to coordinate with each other), and graphs may be no exception. Instead of implementing an organization's entire graph layer in a single codebase, for example, responsibility for defining and/or implementing a graph may be divided across multiple teams. In implementations, individual teams may be responsible for maintaining the portion of a schema that exposes their content and/or services while having the flexibility to develop independently and/or operate on their own release cycle. This may maintain advantages of a single, unified graph while decoupling development efforts across an entity, for example. These example characteristics of a GraphQL federated approach may be key to efficiently scaling a graph across multiple teams so that each team can work on their particular module or slice of the graph in an autonomous fashion with independent delivery of their slice, thereby reducing the exponential comms overhead that may be experienced with other (e.g., monolithic) approaches.

In implementations, a fundamental property of federation (FPF) specifies that theoretically possible queries of interest (e.g., one or more queries of interest, all queries of interest, etc.) for a particular supergraph API schema can be served through a number of subqueries on the subgraphs. For a particular federated approach, such as the approach discussed previously, the FPF may be enforced at least in part by specifying particular rules. For example, for a particular federated approach, three object types may be specified, with individual object types being allowed a single type of subgraph layout. For example, for a particular federated approach, if an entity type has an @key, that key may be used to join fields for an entity across subgraphs (and API-side join), using the @key to index and/or select the required fields from each subgraph. The @key may be used to spread the implementation of an entity type across multiple subgraphs (excluding @provides, in an implementation). Otherwise, for a type having no @key, if the type is a root type (e.g., Query or Mutation), then each field can also only be in a single subgraph (e.g., same rule as for @key but a different way to identify the object type). Otherwise, for a type having no @key and is not a root type (e.g., value types), individual fields must be part of all the subgraphs in which the type is defined. Put another way, all definitions of the type must be identical in each subgraph. Identical across subgraphs means the subgraphs must be relatively highly consistent with each other (e.g., the same). These particular rules and/or permitted layouts may be relatively easy to understand and they do support and/or enforce the FPF. However, such rules and/or permitted layouts for the particular federated approach may be somewhat limiting, restrictive and/or inflexible, for example.

The particular federated approach discussed above requires a relatively higher degree of consistency for shared value types (e.g., all types had to be exactly the same across subgraphs). A further federated approach, such as discussed more fully below, introduces an eventually consistent model so value type changes (e.g., adding a field) may be made one subgraph at a time (e.g., using "@inaccessible" to hide a newly added field until it is added to each subgraph one at a time on their own release schedule) instead of forcing all subgraphs to do a joint release that may be difficult to schedule & coordinate. With the further federated approach and its eventually-consistent model for shared value types, the further federated approach introduces new machine-readable composition hints generated during composition to show the subgraph divergence (inconsistencies) across graph types and/or fields definitions, so they may be observed and/or validated in the supergraph build pipeline with user-defined policies and/or build pipeline automation to validate and/or notify teams of potential issues. As such, the further federated approach may provide more flexibility (e.g., flexible type merging that supports eventually consistent types and/or field definitions across subgraphs and also more visibility and/or control via composition hints to effectively govern this additional flexibility).

As mentioned, a particular federated approach may allow a single subgraph to provide a Query root field that would be composed into the unified graph. Therefore, the query planner may always send the query for a given Query root field to the single and only subgraph that provided that Query root field in the unified graph and then may fetch additional fields from additional subgraphs using the "_entities" and/or "@key" to join in additional subgraph data. As discussed more fully below, a further federated approach may allow multiple subgraphs to provide the same Query root field and the further federated approach query planner may now be able to pick the most advantageous subgraph for the entry point of the query to minimize the number of subgraph fetches, for example.

For a further federated approach, such as an example approach discussed below, a number of object types and/or a number of layouts may be acceptable so long as they do not break the FPF. This means that, in implementations, for one or more particular subgraphs composed into a particular supergraph schema, any layout for the one or more particular subgraphs may be specified to be acceptable as long as queries of interest (e.g., queries based on particular supergraph schema API) can be served from the particular subgraphs. For example, given an object type T, and given any query path to T (e.g., wherein "query path" refers to a chain of fields on the supergraph schema API that starts from a root field and ends on a field of type T or a super-type of T), and additionally given a field f of T on the supergraph API, there exists a "subgraph query path" (e.g., a query plan) to fetch f.

Because for any particular supergraph schema there exists a finite number of types with a finite number of fields, and further because there exists a finite number of query paths (e.g., assuming cycles are broken), validating a particular supergraph schema under the further approach discussed below to ensure adherence to FPF may be computationally feasible.

Figure 5:
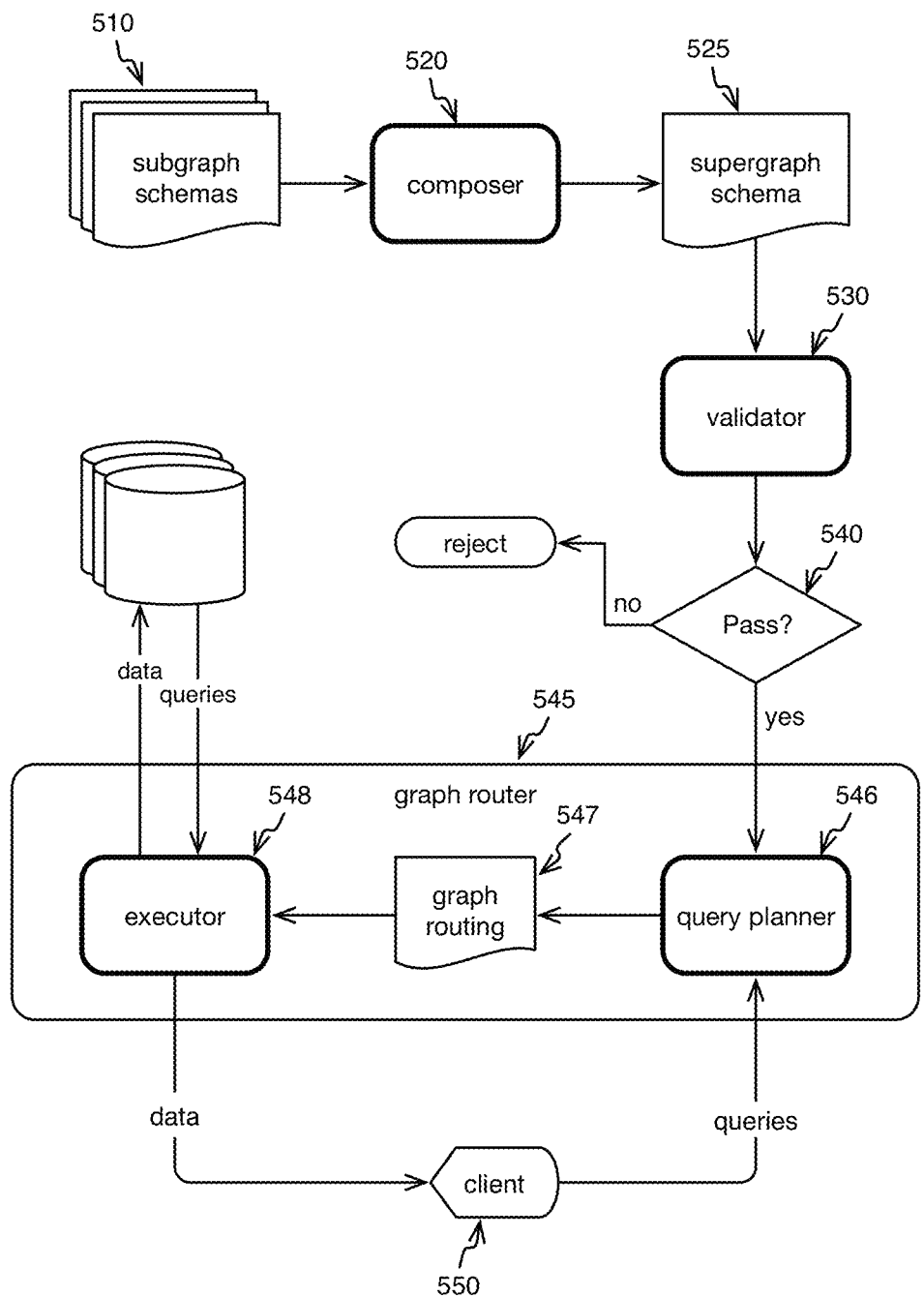
FIG. 5 is a schematic block diagram depicting a further federated approach.

For a further approach for federated graph utilization, such as depicted in FIG. 5, for example, composition rules, guidelines, etc. may be more relatively simple and/or relaxed (e.g., more flexible type merging, more flexible composition rules, etc.) so that composition can succeed in more scenarios and/or to allow for improved schema evolution in multi-team environments, for example. In implementations, a further approach for federated graph utilization may include a generalized composition model based, at least in part, on the FPF that may support smaller incremental changes, more flexible value type merging and/or an improved shared ownership model, for example, as explained more fully below. As also explained more fully herein, a generalized composition model in support of the FPF, with its more flexible value type merging, improved shared ownership model and/or deeper static analysis/validation, in combination with the utilization of declarative graph composition into a static structure (e.g., subgraph schemas composed into a supergraph schema), may provide a number of benefits and/or advantages over other approaches, such as schema stitching and/or other approaches that may be authored in a specific programming language such as Javascript, that may be dynamically evaluated at runtime and that may therefore be more prone to errors. The benefits and/or advantages of the further federated approach may include, for example, an ability to statically analyze a supergraph schema at build time to catch errors sooner, thereby enabling an ecosystem of supergraph tooling that may lint, validate, transform and/or otherwise process a supergraph schema in CI/CD pipelines and/or may send notifications and/or generate reports by which the correctness of a supergraph schema may be validated and/or ensured before it may be delivered to a fleet of graph routers processing client queries at scale, for example.

As mentioned, implementations (e.g., based at least in part on a further federated approach to graph utilization) may include declarative composition into a static artifact (e.g., composing subgraph schema into a supergraph schema) that may be statically analyzed at or near build time instead of just at runtime. Such implementations may allow development teams and/or groups of development teams in a company, for example, to further ensure correctness and/or safety of a composed supergraph at build time in an achievable and bounded way, for example. In contrast, with a schema stitching approach, it may be difficult and/or nearly impossible to validate schema stitching code because it is based on a general programming model instead of a more bounded declarative model that results in a single, statically analyzable federated GraphQL schema, for example.

FIG. 5 is an illustration depicting an embodiment 500 of a process demonstrating a further approach for federated graph utilization. Embodiments may include all of the operations, processes, techniques, approaches, etc. described, fewer than the operations, processes, techniques, approaches, etc. described, and/or more than the operations, processes, techniques, approaches, etc. described for example process 500. Likewise, it should be noted that content acquired or produced, such as, for example, input signals, output signals, operations, results, etc. associated with the example provided may be represented via one or more analog and/or digital signals and/or signal packets. It should also be appreciated that even though one or more operations, processes, techniques, approaches, etc. are illustrated or described concurrently or with respect to a certain sequence, other sequences or concurrent operations processes, techniques, approaches, etc. may be employed. Further, it should be noted that operations, processes, techniques, approaches, etc. may be implemented, performed, etc. by any combination of hardware, firmware and/or software. In addition, although the description below references particular aspects and/or features illustrated in certain other figures, one or more operations, processes, techniques, approaches, etc. may be performed with other aspects and/or features.

In an implementation, a composer process, such as composer 520, may obtain graph schemas, such as subgraph schemas 510, for one or more services and/or may generate a new unified graph schema, such as supergraph schema 525, that may join content from the individual subgraph schemas. Also, in an implementation, a validator process, such as validator process 530, may operate on supergraph schema 525 and/or may ensure that a graph routing exists for theoretically possible queries of interest (e.g., one or more theoretically possible queries, all theoretically possible queries, etc.) against supergraph schema 525. In other words, in an implementation, validator 530 may ensure that theoretically possible supergraph queries of interest can be satisfied by routing content (e.g., data) between queries against one or more subgraphs, for example. As depicted at block 540 of example process 500, supergraph schema 525 may be rejected should it fail validator process 530. As also indicated at block 540, should supergraph schema 525 pass validator process 530, supergraph schema 525 may be provided to a graph router process, such as graph router 545.

In implementations, a validator process, such as validator 530, may be optional. However, if an implementation lacks a validator process that operates at or near build-time, for example, a graph router process, such as graph router 545, may not discover that a query cannot be successfully routed until runtime, responsive to a query being obtained from a front-end application, for example. Such circumstances may result in user-facing errors. For an implementation with a validator process performed at or near build-time, for example, such errors may be discovered prior to deployment, thereby improving service reliability and/or improving user experiences. For example, changes to subgraphs may originate at individual developer's computing devices (e.g., laptops). In implementations, validator processes may be performed on the individual developer's computing devices and this allows validation of subgraph changes relatively very early in the development process.

Again, referring to example process 500, a graph router process, such as graph router process 545, may obtain a supergraph schema, such as supergraph schema 525. Graph router process 545 may accept queries from client computing devices, such as client computing devices 550, and/or may return results to client computing devices, for example. In implementations, graph router process 545 may include a query planner process, such as query planner process 546, and/or may include an executor process, such as executor process 548. In an implementation, query planner process 546 may obtain an incoming query from a client computing device 550 and/or may utilize knowledge of a supergraph schema, such as supergraph schema 525, to construct a graph routing, such as graph routing 547, which may comprise a data structure specifying a set of subgraph queries and/or describing a flow of content between subgraph queries so that content requested by a query can be correctly located, for example. Also, in an implementation, executor process 548 may obtain a routing, such as graph routing 547, and/or may execute the graph routing to perform subgraph queries and/or to route content between the queries.

Referring again to FIG. 5, composer process 520 may obtain subgraph schemas 510 and/or may generate supergraph schema 525 based at least in part on subgraph schemas 510, for example. In an implementation, a supergraph schema, such as supergraph schema 525, may have particular example characteristics and/or properties. For example, in an implementation, types within a supergraph schema, such as supergraph schema 525, may join one or more subgraph types. Further, for example, individual fields within a supergraph schema, such as supergraph schema 525, may refer to fields within one or more subgraphs, such as subgraphs 510. Also, in an implementation, a supergraph schema, such as supergraph schema 525, may define a "join graph" that may associate individual supergraph fields with one or more subgraph fields which can resolve the data. In an implementation, subgraph fields may return different types and/or may contain different scalar content than the supergraph type to which they are joined. Further, in an implementation, it may be the responsibility of a validator process, such as validator process 530 described below, to ensure that such type conversions are valid.

In an implementation, a composer process, such as composer 520, may apply a join policy to construct a supergraph schema, such as supergraph schema 525. A join policy may determine the shape of a join graph, for example. A join policy's format may be implementation-dependent and/or may generally depend on a particular encoding of a graph. For example, if an encoding gives names to types and/or fields, a join policy might attempt to join subgraph types that may have the same name, in an implementation.

In addition to the various federated approaches discussed above, it may be advantageous to discuss additional embodiments and/or implementations that may provide a range of benefits and/or advantages in a wide range of circumstances. For example, a particular goal may be to make it relatively easier for client developers to build performant real-time (or near real-time) applications on top of a federated-type graph powered by a graph router while limiting, at least to an extent, additional demands on subgraphs.

In implementations, the GraphQL specification may support the concept of "subscriptions" (e.g., "Subscription" operation as defined in the GraphQL specification) as an approach to handling real-time data communication. However, due at least in part to their relative complexity and/or relatively limited granular controls, subscriptions may not be as useful in some circumstances. For example, subscriptions may, in at least some circumstances, require use of a subscription type model (e.g., to model discrete events in a system), separate from a normal query type model (e.g., as provided in the Query root fields of a GraphQL schema). Subscriptions may create a significant burden on both subgraph authors and application developers who have to build, maintain, use, and/or combine separate subscription type models in addition to the primary Query root fields and/or query types used to initially populate an application screen and/or web page. Building and/or maintaining an additional subscriptions type model (e.g., that may be required for a subscriptions approach to real-time data) may reduce the velocity of application development and/or may increase the cost of delivering new features to end-users, for example.

To address at least some of the disadvantages and/or challenges of a subscriptions-type approach, a live queries approach to real-time (or near real-time) data communication wherein portions of queries may be marked as "live" and wherein an existing query type model may be used, often without modification to the graph schema, for example.

It may prove beneficial to discuss some differences between subscription-type approaches and live query-type approaches. A subscription-type approach, for example, may allow clients to respond to specific events of interest by using a subscription operation type. For example, one may have a subscription that may react to a data insertion. When the insertion occurs, the server may send the new data to the client. Further, for example, GraphQL subscriptions may often utilize an event bus and/or the like and/or may often take advantage of an existing publish/subscribe (pub/sub) infrastructure. Also, for example, because subscription root fields may be part of a schema, deciding which events to expose may become a design question that a client and/or server may have to negotiate. Additionally, for example, a subscription-type approach may not have sufficiently robust support in federated approaches in some circumstances, such as those discussed above.

Looking now at live query-type approaches generally, a live query-type implementation may include a server-type computing device and/or the like, for example, watching the latest result of a query and whenever the result changes, the server may return the latest result to a client. Rather than responding to a particular event, a live query-type implementation may monitor for changes in a query result, for example. Also, for example, a live query-type implementation may be designed to respond to content (e.g., data) changes directly, rather than acting in response to the particular events that may cause these changes. Further, a live query-type implementation may not require additions to a schema, but may rather allow inclusion of a "@live" directive on a query fragment, for example, to signal the desire for live query semantics, for example. Additionally, for example, a live query-type implementation may make it relatively easier for application developers to solve a number of real-time use cases by using live query support in various technologies, including, for example, Apollo Graph, Inc. technologies such as Apollo Clients (e.g., web, iOS, Kotlin), Apollo Router, Federation 2 (e.g., the further federated approach discussed previously), and/or any arbitrary subgraph (e.g., without modification), for example.

The discussion that follows outlines an example application development experience using a live query-type approach from the client side of an application. For example, in implementations, queries sent to a GraphQL backend from a client (e.g., Apollo Client) may be labeled with a "@live" directive to identify parts of a query result that may not be returned to the client right away. This means client developers can help ensure that the more important parts of queries may be responded to first but still know the other parts will come back eventually.

It may be fruitful to discuss differences in client developer experiences between a subscription-type approach and a live query-type approach. GraphQL subscriptions may comprise a particular operation type in addition to queries and mutations, for example. Subscriptions may utilize their own root type in a schema (e.g., usually called "Subscription") with its own fields that may allow clients to subscribe to specific events of interest. Subscriptions may deliver new content (e.g., data) as particular events happen. This may result in many scenarios utilizing a combination of queries and subscriptions, with initial data being fetched first and then a subscription may return content in response to relevant events that may change that content. Note that because the initial query and the subscriptions execute independently, there may be no guarantee that content that may have changed in the meantime may not be missed.

For example, let's assume that a post and a list of associated comments are being shown. Initial data may first be fetched for the post and comments:

```
query PostWithComments($postID: ID!) {
  post(id: $postID!) {
    id
    title
    body
    likeCount
    comments {
      id
      body
    }
  }
}
```

Next, a client, for example, may subscribe to events (e.g., all events or particular events) that may change content of interest. For example, it may be desired to keep the list of comments up to date by getting notified each time a new comment is added. If a schema includes a "commentAdded"

subscription root field, for example, a subscription may be defined that may take advantage, such as, for example:

```
subscription CommentAdded($postID: ID!) {
  commentAdded(postID: $postID!) {
    id
    body
  }
}
```

Client developers may also be responsible for reacting to incoming subscription results. For example, a developer may want to take a new comment and ensure it is added to the list of comments for the previously fetched post. An API for this example may vary depending on specific clients, for example, and there may be multiple ways of accomplishing the same thing. Often, circumstances may suggest manual manipulation of query results, for example.

Further, the above example pertains to a single event. The above example may not keep the list of comments up to date as comments are changed and/or removed. For example, additional subscriptions may be needed for events such as commentChanged and/or commentRemoved and/or the like to keep the list of comments up to date in response to changes or removals. Also, such subscriptions don't keep other data that is fetched as part of the initial query up to date. For example, if it is desired to update likeCount, another subscription would be needed.

To summarize, if it is desired to keep a particular user interface component, for example, up to date using subscriptions, subscriptions may be required for every event that could lead to the displayed data changing, and it may be necessary to process each type of result appropriately so the data becomes incorporated into a client cache and/or propagated to the user interface, for example. Even for a seemingly straightforward data model like this example, that may become exceedingly involved.

With respect to schema design for subscriptions, client developers may be dependent on the schema exposing appropriate subscription root fields. If the schema doesn't define commentRemoved for example, a developer may not be able to react to comments being removed. Because subscription root fields may be part of the schema, deciding which events to expose may pose a design question that client and/or server teams may negotiate. There may be a cost to having many subscription root fields due at least in part to the many subscription root fields being implemented and/or maintained. Once subscription root fields are in use by clients, a developer may not simply remove or change them at will because they are part of the schema and therefore carry the same compatibility burden as other fields, for example.

A point of note for schema design is that subscriptions may return all requested fields every time an event occurs, even if a particular piece of data hasn't changed. For example, even if "likeCount" is the only thing that changed, this example subscription would always return the full body of the post and all author data with every response:

```
subscription PostChanged($postID: ID!) {
  postChanged(postID: $postID!) {
    id
    title
    body
    likeCount
    author {
```

-continued

```
      id
      firstName
      lastName
      onlineStatus
    }
  }
}
```

To avoid this, a developer may define a "likeCountChanged" instead, but that way one might end up with many fine-grained subscription root fields (e.g. postTitleChanged, userOnlineStatusChanged). There may be trade-offs to consider here, and that may mean the available subscriptions may often be disadvantageous and/or suboptimal for a particular client's needs.

Moreover, a developer may have to decide on the semantics of the subscription root fields. For example, will postChanged be triggered when the author of a post changes? Perhaps. Or, when particular data for that author (like onlineStatus) changes? Probably not, but one can't really be sure, and a developer may have to rely on documentation to communicate intentions.

Live query-type approaches, on the other hand, may comprise a variant of regular GraphQL queries. Live queries may not rely on a separate root type, but rather may allow a developer to decorate any query with an "@live" directive to indicate a need for keeping the requested data up to date. In contrast to subscriptions, live queries may be designed to respond to data changes directly rather than to individual events that may cause these changes. As utilized herein, an "@live" directive and/or the like refers to a directive that specifies particular content to be kept up to date.

From a client developer perspective, live query-type approaches may be relatively significantly easier to use, such as compared with a subscription-type approach, for example. With a live query-type approach, there may be no need to reason separately about events that might change the data one cares about. Instead, a developer may simply add an @live directive to an initial query. For example:

```
query PostWithComments($postID: ID!) @live {
  post(id: $postID!) {
    id
    title
    body
    likeCount
    comments {
      id
      body
    }
  }
}
```

In implementations, live queries may comprise a declarative mechanism, for example. It may be up to a client (e.g., Apollo Client) and/or a server (e.g., a graph router in particular implementations) to work together to ensure liveness. Client developers may not necessarily need to know the details of this, and they may change over time as capabilities are added to the client, graph router, and/or backends (e.g., taking advantage of timely and/or efficient invalidation signals vs. relatively slower and/or more expensive graph router query re-execution in a polling loop).

Looking for a moment at naïve approaches to live queries, such approaches in a graph router may include simply re-executing a query over and over in the graph router for each connected client and/or may include sending the entire query results whenever any change is detected. This type of approach simply moves polling for new data from clients to the graph router, where it may consume computing resources due at least in part to relatively continuous query re-execution, for example. Further, the timeliness of such polled data may be subject to a worst-case delay of an entire polling interval (often of several seconds), for example, resulting in applications that are slower to update, which is often unacceptable and/or undesirable. One way to mitigate the relative slowness of naïve live query-type approaches may be to increase the frequency at which a graph router re-executes queries to reduce or minimize worst-case delay. However, this approach may increase the volume of query re-execution to the point where it may not be feasible to re-execute queries fast enough (e.g., in a tight loop) due at least in part to the excessive resource utilization a naïve live query-type approach may create both in the graph router and/or backend services it may depend on to fetch data for a query. As such, naïve live query-type approaches may often not be practical for applications that may require lower latency updates and/or non-excessive use of computing resources, for example.

Returning now to non-naïve live query-type approaches, a non-naïve approach to live queries in a graph router, in contrast to subscription-type approaches and/or naïve live query approaches, may be free to improve and/or optimize content (e.g., data) delivery and/or may rely on a combination of historic subgraph fetch caching, federated entity-based cache invalidation, and/or sending efficient diffs to clients to reduce (e.g., minimize) data transfer and/or processing costs. These improvements and/or advantages may be transparent to client developers and/or it may be easier for backend developers to trigger a live update from existing code in other systems (e.g., Kafka observers, web hooks, pub/sub, and/or other event handlers) without the need to modify subgraphs directly. Non-naïve live query-type approaches (also referred to herein a "further" live query-type approaches and/or the like), described below in more detail, address, at least in part, the limitations of subscription-based approaches and/or naïve approaches to live queries outlined above.

For example, implementations pertaining to a further approach to live queries in a graph router may support sub-query caching and/or invalidation mechanisms in graph router systems and/or processes to support live query based real-time workflows, explained in more detail below. Further, for example, a live query-type implementation may not burden subgraph owners and/or subgraph library maintainers, as a live query-type implementation may be realized with client-driven directives that may not surface in subgraph schemas, composition and/or a supergraph schema. The use of live queries may require no changes to subgraph libraries, unlike subscription-type approaches, which may result in client application utilization in live query-type systems without undue delay. Additionally, live query-type implementations may take advantage of distributed caching in the routing layer. For example, a plurality of graph router (e.g., graph router computing device) instances may be leveraged to cache subgraph fetches to provide relatively much higher scalability and/or performance with respect to other approaches. Live query-type approaches may also help preserve hypertext transport protocol (HTTP) cache compatibility which may result in live queries being utilized with existing HTTP caching and/or edge-type caching solutions, for example. Of course, these are merely example benefits and/or advantages that may be realized with a live query-type approach with respect to other approaches, such as subscription-type approaches and/or naïve live query-type approaches.

As discussed more fully below, embodiments and/or implementations pertaining to live query-type approaches in a graph router may include, for example, historic subgraph fetch caching tagged with entity keys for invalidation (e.g., shared across all router instances), entity-based invalidation API (e.g., pass an entity reference to invalidate), and/or efficient diff/delta update to clients.

While many of these improvements and/or optimizations may be transparent to client developers, some configuration options may be exposed to client developers. For example, it may be advantageous to allow an @live directive, described above, to be used on specific fields as opposed to the query as a whole. In this example, via an @live direction, a system may respond to changes to likeCount and/or comments, but may not be watching for changes to other data (e.g., the title or body):

```
query PostWithComments($postID: ID!) {
  post(id: $postID!) {
    id
    title
    body
    likeCount @live
    comments @live {
      id
      body
    }
  }
}
```

In implementations, more finely-grained liveness may be advantageous because there may be different costs associated with keeping different pieces of data up to date. For example, one subgraph may be able to efficiently notify the graph router of changes while another may rely on polling, and fetching certain fields may be more costly than others.

In some implementations, live query-type approaches may be designed to work on top of any subgraph, with reduced or minimal additional demands. In implementations, it may be the responsibility of a graph router to detect changes in content (e.g., data) obtained from subgraphs and/or to communicate these efficiently to a client. Implementations may support an invalidation API for active change detection and/or implementations may rely on poll-and-diff as a fallback strategy.

In some circumstances, a relatively straightforward way to implement live queries may be to periodically poll subgraphs from the graph router and/or to compare results with previously cached results to detect changes. Note that this implementation refers to the graph router polling subgraphs rather than clients polling the graph router. Depending at least in part on the characteristics of a particular query, this may mean an ability to multiplex multiple queries to the same subgraph, possibly from different clients, for example.

In implementations, polling may build on subquery caching and/or may rely on a time-to-live (TTL) parameter to configure a polling interval. Another way of looking at this example implementation is that live queries may not need to offer stronger freshness guarantees than developers may do for normal queries. If there is a window where a normal query might return a cached result that is slightly out of date with an underlying data source, that means it should be acceptable for a live query to not reflect those changes during that window as well, for example.

In implementations, subgraphs may configure a TTL parameter (e.g., through a HTTP CacheControl header in subgraph responses and/or an existing @cacheControl directive), and/or developers may offer means for subgraphs to support more efficient revalidation (e.g., using an ETag-like mechanism) to reduce traffic and/or diffing, for example.

Relying on polling may limit or reduce the resolution of a live query, however. If a polling interval is set to five seconds, for example, it may take five seconds for a data change to be detected. Whether this is acceptable depends on the particular use case, but a benefit may be that initial demands on subgraphs to support live queries may be relatively minimal or reduced. In contrast, subscriptions may require explicit subgraph support at least in part due to subscription root fields needing to be defined and/or events having to be generated and delivered.

To avoid unnecessary polling, and for use cases that may require relatively quick or immediate detection of data changes, an invalidation API may be exposed that subgraphs and/or other systems may call into to invalidate particular entities by key. Where those invalidation signals originate may be implementation specific, but an implementation may comprise an event bus having content (e.g., data) that may be hooked into, such as Change Data Capture (CDC) events, for example.

Explicit invalidation may be advantageous because, for example, it may allow data changes to be detected relatively quickly or immediately and/or because it may mean the polling interval can be much longer, which may improve performance. Explicit invalidation may comprise an optional improvement and/or may be enabled incrementally on a per subgraph and/or per entity basis without affecting existing clients, for example.

In implementations, not all data changes may be caused by GraphQL mutations. In many cases, backends may make changes to data stores directly and/or changes may be made through other (e.g., non-GraphQL) APIs. When GraphQL mutations are received by the graph router, however, the affected entity may be automatically invalidated, for example.

Figure 6:
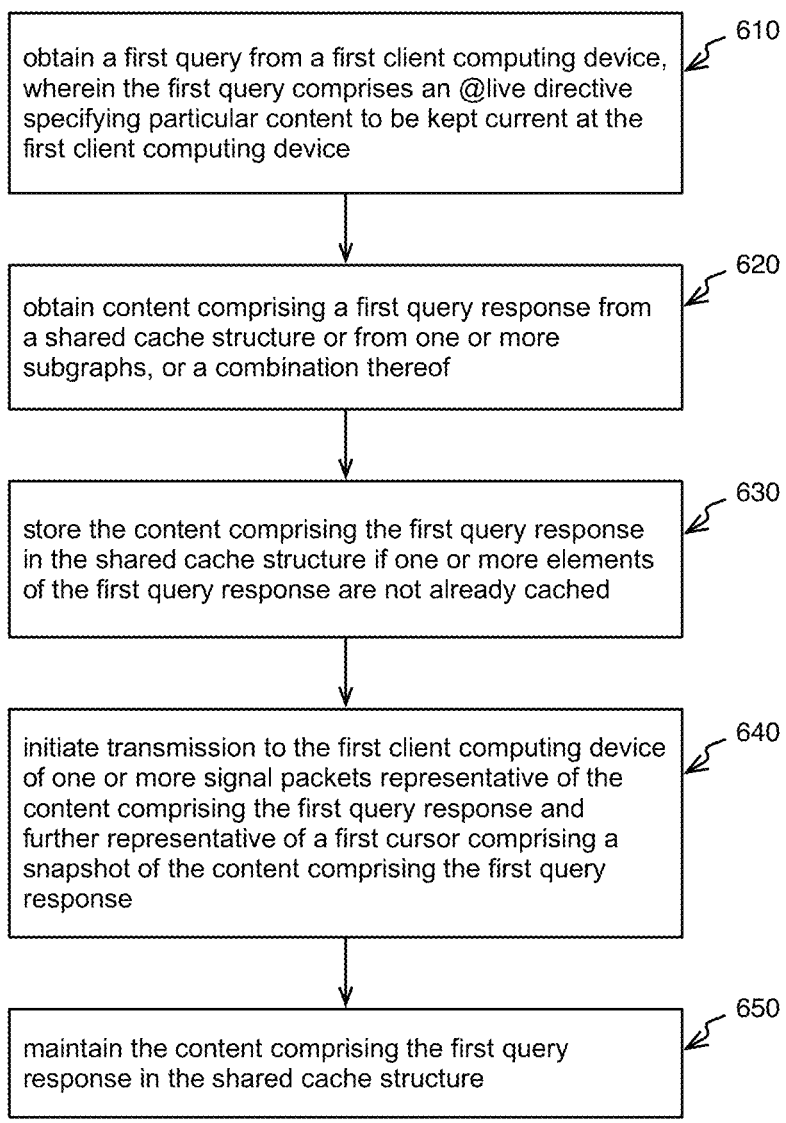
FIG. 6 is a flow diagram depicting an example process for live queries, in accordance with an embodiment.

FIG. 6 is a flow diagram depicting an embodiment 600 of an example process for live queries. Embodiments may include all of the operations, processes, techniques, approaches, etc. described, fewer than the operations, processes, techniques, approaches, etc. described, and/or more than the operations, processes, techniques, approaches, etc. described for example process 600. Likewise, it should be noted that content acquired or produced, such as, for example, input signals, output signals, operations, results, etc. associated with the example provided may be represented via one or more analog and/or digital signals and/or signal packets. It should also be appreciated that even though one or more operations, processes, techniques, approaches, etc. are illustrated or described concurrently or with respect to a certain sequence, other sequences or concurrent operations processes, techniques, approaches, etc. may be employed. Further, it should be noted that operations, processes, techniques, approaches, etc. may be implemented, performed, etc. by any combination of hardware, firmware and/or software. In addition, although the description below references particular aspects and/or features illustrated in certain other figures, one or more operations, processes, techniques, approaches, etc. may be performed with other aspects and/or features.

Example process 600 may comprise live query operations, processes, techniques, approaches, etc. that may be implemented, performed, etc. by one or more graph server computing devices, such as graph router 545. As indicated at block 610, a first query may be obtained from a first client computing device. In implementations, the first query may comprise an @live directive specifying particular content to be kept current at the first client computing device. In implementations, content comprising a first query response may be obtained from a shared cache structure or from one or more subgraphs, or a combination thereof, as indicated at block 620. Also, in implementations, content comprising the first query response may be stored in the shared cache structure. For example, if one or more elements of the first query response are not already cached, the elements may be stored in the shared cache structure. See, for example, block 630.

Additionally, in implementations, transmission to the first client computing device of one or more signal packets representative of content comprising the first query response and further representative of a first cursor comprising a snapshot of content comprising the first query response may be initiated, as indicated at block 640. Further, as indicated at block 650, content comprising the first query response may be maintained in the shared cache structure.

Various additional details pertaining to various implementations for live query-type approaches, including example process 600, are described in the preceding and following discussions.

Figure 7:
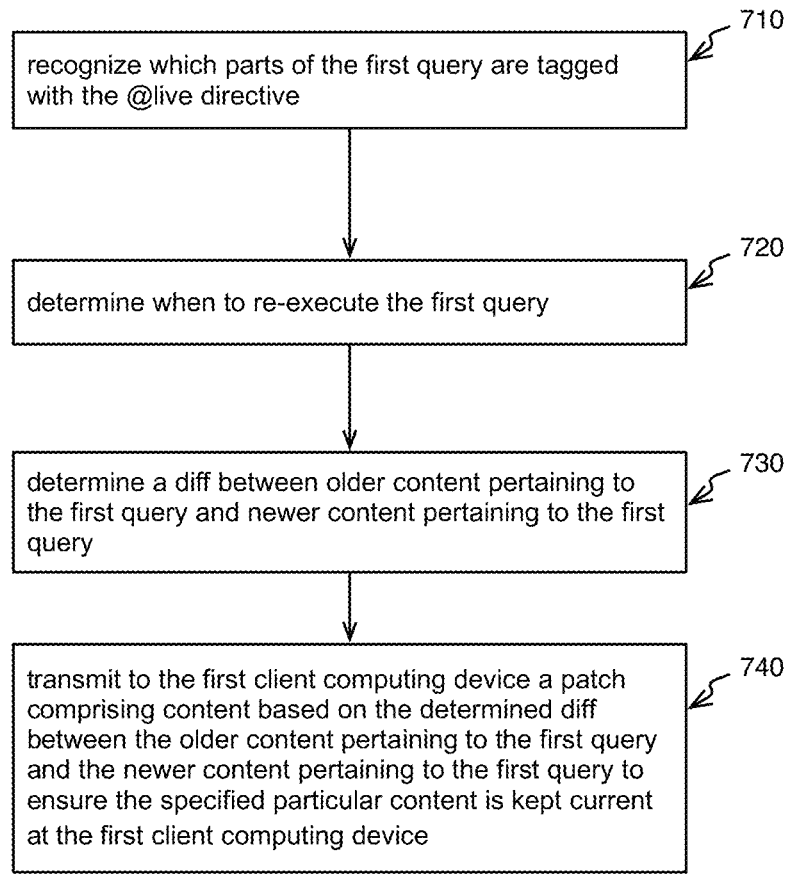
FIG. 7 is a flow diagram depicting an example process for live queries, in accordance with an embodiment.

FIG. 7 is a flow diagram depicting an embodiment 700 of an example process for implementation of live queries. Embodiments may include all of the operations, processes, techniques, approaches, etc. described, fewer than the operations, processes, techniques, approaches, etc. described, and/or more than the operations, processes, techniques, approaches, etc. described for example process 700. Likewise, it should be noted that content acquired or produced, such as, for example, input signals, output signals, operations, results, etc. associated with the example provided may be represented via one or more analog and/or digital signals and/or signal packets. It should also be appreciated that even though one or more operations, processes, techniques, approaches, etc. are illustrated or described concurrently or with respect to a certain sequence, other sequences or concurrent operations processes, techniques, approaches, etc. may be employed. Further, it should be noted that operations, processes, techniques, approaches, etc. may be implemented, performed, etc. by any combination of hardware, firmware and/or software. In addition, although the description below references particular aspects and/or features illustrated in certain other figures, one or more operations, processes, techniques, approaches, etc. may be performed with other aspects and/or features.

Example process 700 may comprise live query operations, processes, techniques, approaches, etc. that may be directed, at least in part, at maintaining live query result content in a shared cache structure, for example. In implementations, example process 700 may be implemented, performed, etc., at least in part, by one or more graph server computing devices, such as graph router 545.

As indicated at block 710, a graph server, for example, may recognize which parts of a first query are tagged with a @live directive, in implementations. Also, for example, a determination may be made as to when to re-execute the first query, as indicated at block 720. Further, a diff may be determined between older content pertaining to the first query and newer content pertaining to the first query, for example, as indicated at block 730. As shown at block 740, a patch comprising content based on the determined diff between older content pertaining to the first query and newer content pertaining to the first query may be transmitted to the first client device to ensure specified particular content is kept current at the first client computing device, in implementations. Various additional details pertaining to various implementations for live query-type approaches, including example process 700, for example, are described in the preceding and following discussions.

In implementations, graph routers (e.g., graph router computing devices) may support what might be referred to as incremental transport. For example, incremental transport may comprise a format for queries and/or responses (e.g., JSON queries and/or responses) using live queries with a graph router system. As mentioned, live query-type approaches may comprise a way for a client to indicate that it wants to receive updates to a query or part of a query via use of a @live directive. As also mentioned, this may be different from a subscriptions-type approach which may require the definition of a top level operation for each type of data that could be updated, and/or may be paired with an initial query.

In implementations, an operationsByName field may be utilized. A JSON query, for example, may comprise a GraphQL query defining one or more operations and/or an operationsByName field that may comprise a map of operation name, variables and/or extensions. Operations may be executed in parallel, for example, and/or results may be communicated as multipart responses in the same format as @defer responses, for example, although subject matter is not limited in scope in these respects. This mechanism may allow developers to implement batching relatively easily. For example, compared to classic operation batching, one need not wait for the slowest query to finish to send results.

In implementations, an operation in operationsByName may include a cursor field indicating that the latest data is requested, may include an ID to obtain the changes since a response was last received with that cursor ID, and/or may include a diff between two cursor IDs, for example. In implementations, a cursor ID may allow a client to restart from a previous state if it disconnected. In implementations, it may be advantageous to have cursor IDs shared between graph router instances, so some central state management may be beneficial.

In implementations, a cursor ID format may include a hash of a particular query and/or variables. Asynchronous cursor delivery may allow the cursor to be a deterministic hash of the query/variables and the final results, thereby significantly reducing the total quantity of distinct cursors needing to be created, stored and/or distributed as compared with implementations using arbitrary, generated, nondeterministic, UUID-style identifiers, for example.

In an implementation, a cursor may be formatted as follows:

<query hash>-<variables hash>-<result hash>

This may allow multiple clients to subscribe to the same content (e.g., data), for example.

In an implementation, graph router functionality may rely, at least in part, on "poll and diff" at intervals (e.g., fixed intervals), although subject matter is not limited in scope in these respects. In other implementations, graph router functionality may be time-to-live (TTL) based, wherein a graph router may aggregate cache control information for each entity, may store an expiration date (e.g., minimal expiration date) for entities, and/or may set the expiration date as a date for the next poll, for example. Implementations may also include invalidation functionality linked at least in part to subgraph entity caching, for example. In implementations, an invalidation API may be used to invalidate an entity and/or field, and that may trigger invalidation for dependent queries, for example.

For an example live query-type approach, a query may be received at a graph router, such as graph router 340 and/or 545. The query for this example may include operationsByName, split into multiple subqueries, that may undergo a query planning, execution, formatting process, such as example processes described above, and the various responses may be assembled in a stream like multipart incremental responses, for example. In implementations, responses for live queries may be stored in a memory and/or in an external cache memory. Also, in implementations, a default polling interval may be specified to re-execute live queries, to make a diff with previously stored response and/or to send the diff results to the client to ensure the client has up-to-date content.

TTL (time-to-live)-type approaches may relate to aggregating cache control data per subgraph response to subgraph entity caching, for example. For live query-type approaches, once the TTL for individual entities is known, it may be determined when to poll again, for example. In implementations, individual entities may be cached with its own TTL, and thus, for example, it may not be needed to query everything again. In implementations, this may not assume an invalidation API.

In implementations, having a mechanism to signal invalidation (e.g., through an API in the graph router, via the graph router subscribing to updates from the subgraphs, etc.) may provide a way for the graph router to react to changes and/or to send new responses to live queries. For example, live query-type implementations may share data between multiple graph router instances. Implementations may also link a subgraph entity to a specific live query to, for example, reconstruct a past query from a cursor and/or invalidate a query when one of its entities changes. Further, implementations may prevent the "thundering herd" issue, where multiple graph routers, having received an invalidation notification, may not try to do the same work all at the same time. Implementations may also regularly clean up the content (e.g., data) of older entities, for example.

In implementations, a graph router computing device, such as graph router 340 and/or 545, may utilize a key-value (KV) database to store cached data (e.g., Redis, Memcached, etc.). This may avoid storing all of the content (e.g., data in the form of signals and/or states) in memory and/or on disk with a custom scheme (although implementations may utilize one level of in-memory cache, for example). This may also allow data sharing between graph router instances, in implementations.

Also, in implementations, it may be advantageous to signal that content (e.g., data) is invalidated without all graph router instances performing the query at the same time. Note that it may not be necessary to send the invalidation signal to all nodes at once or rely on complicated distributed locks, for example. Because implementations may generally work with largely (e.g., mostly) immutable content, implementations may not require all nodes to agree on anything. In implementations, an example approach may include sending an invalidation signal to a particular graph router instance. That particular graph router instance may refresh the data, and the data may be stored in a cache, for example. Further, for example, the particular graph router may signal to other graph router instances to refresh the data and/or the particular graph router may answer the invalidation signal to indicate that it is done. In implementations, if at any point in the process the graph router fails, the process may be restarted and/or may converge on the same result and/or on more recent data.

It may be beneficial to implement an efficient schema design to retrieve data from the cache with a reduced number of requests. In an implementation, a cursor may have a format as follows:

<query>-<variables>-<timestamp>-<response hash>

Also, in an implementation, a key format for a top level operation, for example, may be represented as follows:

<subgraph>-<subquery>-<variables>-<timestamp>

And, for example, a key format for a subgraph entity may be represented as:

<subgraph>-<subquery>-<variables>-<entity type>-<id>-<timestamp>

Further, for example, a timestamp may be set at the beginning of the query so that the data (e.g., all of the data) may be linked to the cursor.

In an implementation, if it is desired to retrieve data (e.g., all of the data) linked to a cursor, subqueries may be extracted from a query plan and then a look up may be performed for individual subgraph entities using the timestamp from the cursor, for example. For circumstances in which more recent data may be desired, responsive at least in part to receiving a query with a cursor, subqueries may be extracted from a query plan, data may be looked up for that cursor and/or a latest subquery result may be looked up. In a Redis-type data store and/or the like, for example, this may be done with a SCAN operation obtaining keys matching a prefix, then looking at the last one, checking if it is expired, returning it if it is not, and/or otherwise refreshing the data. Of course, subject matter is not limited in scope in these respects.

In implementations, a Redis-type pub/sub system and/or the like may be utilized, for example, to obtain notifications regarding invalidation. For example: graph router instances that receive a query with cursor <query>-<variables>-<timestamp>-<response hash> may subscribe to the keys <query>-<variables>, <subgraph>-<subquery>-<variables> and <subgraph>-<subquery>-<variables>-<entity type>-<id>, and <subgraph>-<entity>-<id>. In implementations, when an instance receives an invalidation notification, it may refresh the data and/or may publish an invalidation notification on the related keys. Further, instances may keep a reference count of subscriptions depending on the number of clients asking for it and/or may unsubscribe if all the related clients become disconnected. In implementations, a graph router may incorporate means to signal from subscriptions to specific sessions, for example.

In implementations, graph routers, such as those discussed above (e.g., implemented, at least in part, via Apollo Router, Apollo Cloud Router, etc.), for example, may be advantageously utilized to offer subgraph-level caching, decentralized configuration, and/or other features that may take advantage of one or more of the federated approaches discussed above that may help drive a real-time content (e.g., data) system.

Unlike alternate approaches to real-time data in a federated supergraph, live query-type approaches in a graph router discussed herein may be unique and/or advantageous in several ways. For example, implementations described herein may be relatively more efficient, scalable, responsive, and/or may provide improved developer experience. Other approaches (e.g., that may require build time compilation of the graph which makes it not suitable for public APIs and the global graph) may offer some of these, but not all in combination, and especially not in a federated GraphQL architecture, for example. Implementations pertaining to live query-type approaches in graph routers described herein may uniquely solve for the various example goals and/or advantages mentioned above with a number of example aspects, such as those discussed above and/or such as those discussed below.

FIGS. 8*a*-12*b* are example message flow diagrams for example live query processes, including example processes pertaining at least in part to the various example aspects discussed above. Also, a number of additional details pertaining to example implementations, including the example message flow diagrams provided at FIGS. 8*a*-12*b*, are included under various section headings shown below. Embodiments in accordance with claimed subject matter may include all of the messages and/or operations of example processes shown in FIGS. 8*a*-12*b*, fewer than the messages and/or operations of example processes depicted in FIGS. 8*a*-12*b*, and/or more than the messages and/or operations of example processes shown in FIGS. 8*a*-12*b*. Likewise, it should be noted that content acquired or produced, such as, for example, input signals, output signals, operations, results, etc. associated with example message flows of FIGS. 8*a*-12*b* may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In embodiments, the messages and/or operations of example processes shown in FIGS. 8*a*-12*b* may be communicated as one or more signals and/or signal packets among various software, firmware and/or hardware services executed at various computing devices, for example.

Figure 8A:
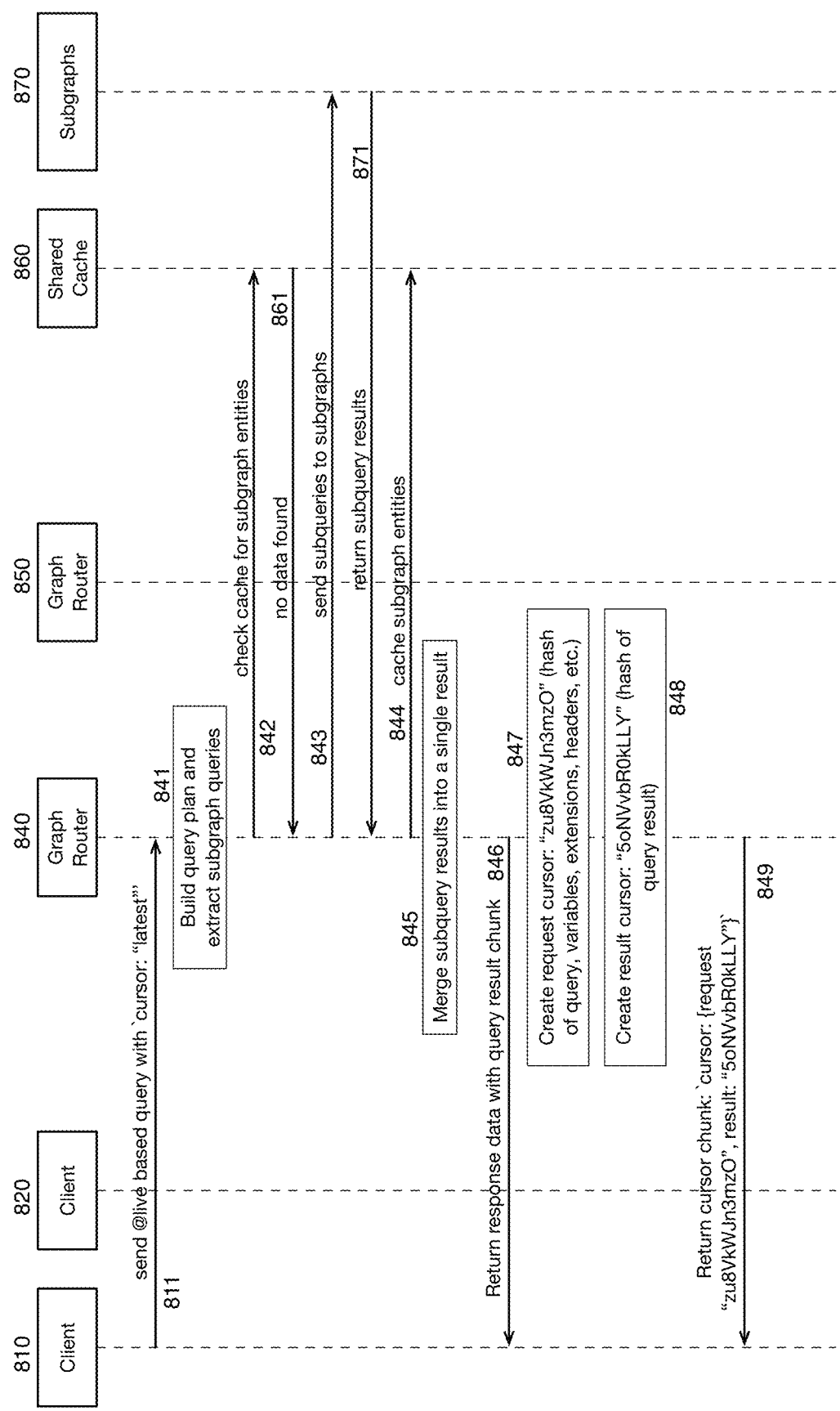
FIGS. 8a-8b depict a message flow diagram for an example live query process including historical shared caching of subgraph fetches and/or incremental delivery of @live query results, in accordance with an embodiment.
Figure 8B:
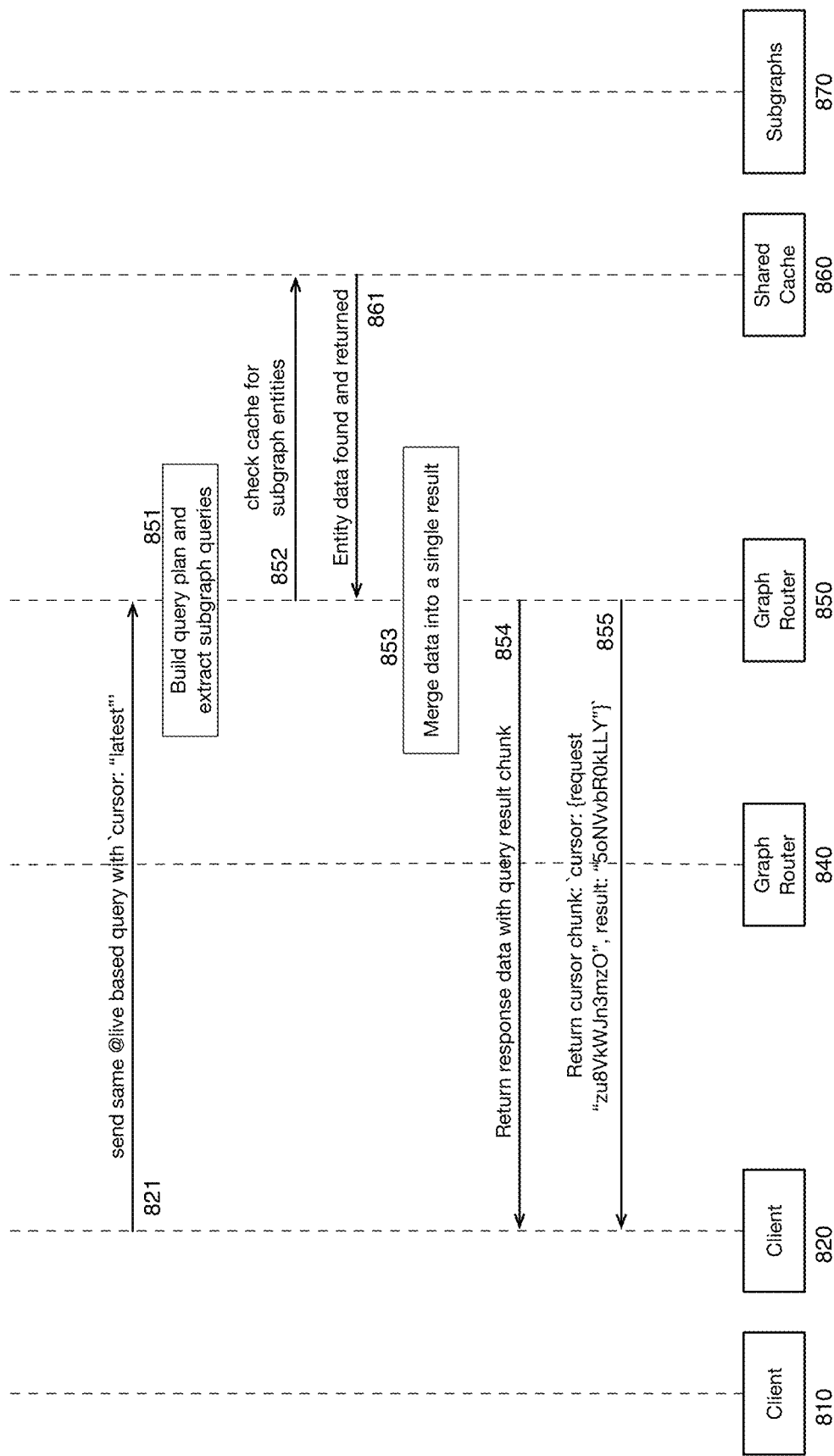

FIGS. 8*a*-8*b* depict a message flow diagram 800 for an example live query process including historical shared caching of subgraph fetches and/or incremental delivery of @live query results. Example message flow diagram 800 may also include change notification streamed tailored, at least in part, for client queries of interest, for example.

As depicted, client computing device 810 may send an @live based query with a 'cursor: "latest"' to a graph router computing device 840, for example, as indicated at arrow 811. Graph router 840 may build a query plan and/or may extract subgraph queries, as depicted at block 841, for example. Additionally, for example, graph router 840 may instruct a shared cache data structure 860 to check for subgraph entities, as indicated at arrow 842. In an implementation, shared cache 860 may signal to graph router 840 that no data was found, for example, as indicated at arrow 861.

In implementations, responsive at least in part to shared cache 860 indicating no data found to graph router 840, graph router 840 may send subqueries to one or more subgraphs 870, as indicated at arrow 843. Also, in an implementation, subgraph(s) 870 may return subquery results to graph router 840, as indicated at arrow 871. Graph router 840 may, for example, initiate caching of subgraph entities, as indicated at arrow 844. Further, as indicated at block 845, graph router 840 may merge subquery results into a single result, for example.

In implementations, graph router 840 may return query response content (e.g., query response chunk) to client 810, as indicated at arrow 846. In implementations, graph router 840 may create a result cursor. For example, graph router 840 may create cursor "zu8VkWJn3mzO" (hash of query, variables, extensions, headers, etc.), as indicated at block 847. Further, for example, graph router 840 may also generate a result cursor, such as "5oNVvbR0kLLY" (hash of query result), as indicated at block 848. Additionally, graph router 840 may return a cursor chunk, such as 'cursor: {request "zu8VkWJn3mzO", result: "5oNVvbR0kLLY"}', to client 810, for example, as indicated at arrow 849. Of course, subject matter is not limited in scope to these particular example cursors and such.

Additionally, for example, an additional client computing device, such as client 820, may send the same @live based query with a cursor, such as 'cursor: "latest"', as indicated at arrow 821. As further indicated at block 851, graph router 851 may build a query plan and/or may extract subgraph queries, for example. Also, as indicated at arrow 852, graph router 840 may check shared cache 860 for subgraph entities. For this example, shared cache 860 may locate and may return entity data, as indicated at arrow 861. In implementations, graph router 840 may merge data (e.g., returned entity data) into a single result, for example, as indicated at block 853.

As further indicated at arrow 854, graph router 840 may return response data with a query result chunk to client 820, for example. Also, in implementations, graph router 840 may return to client 820 a return cursor chunk, such as 'cursor: {request "zu8VkWJn3mzO", result: "5oNVvbR0kLLY"}', although subject matter is not limited in scope in these respects.

Figure 9A:
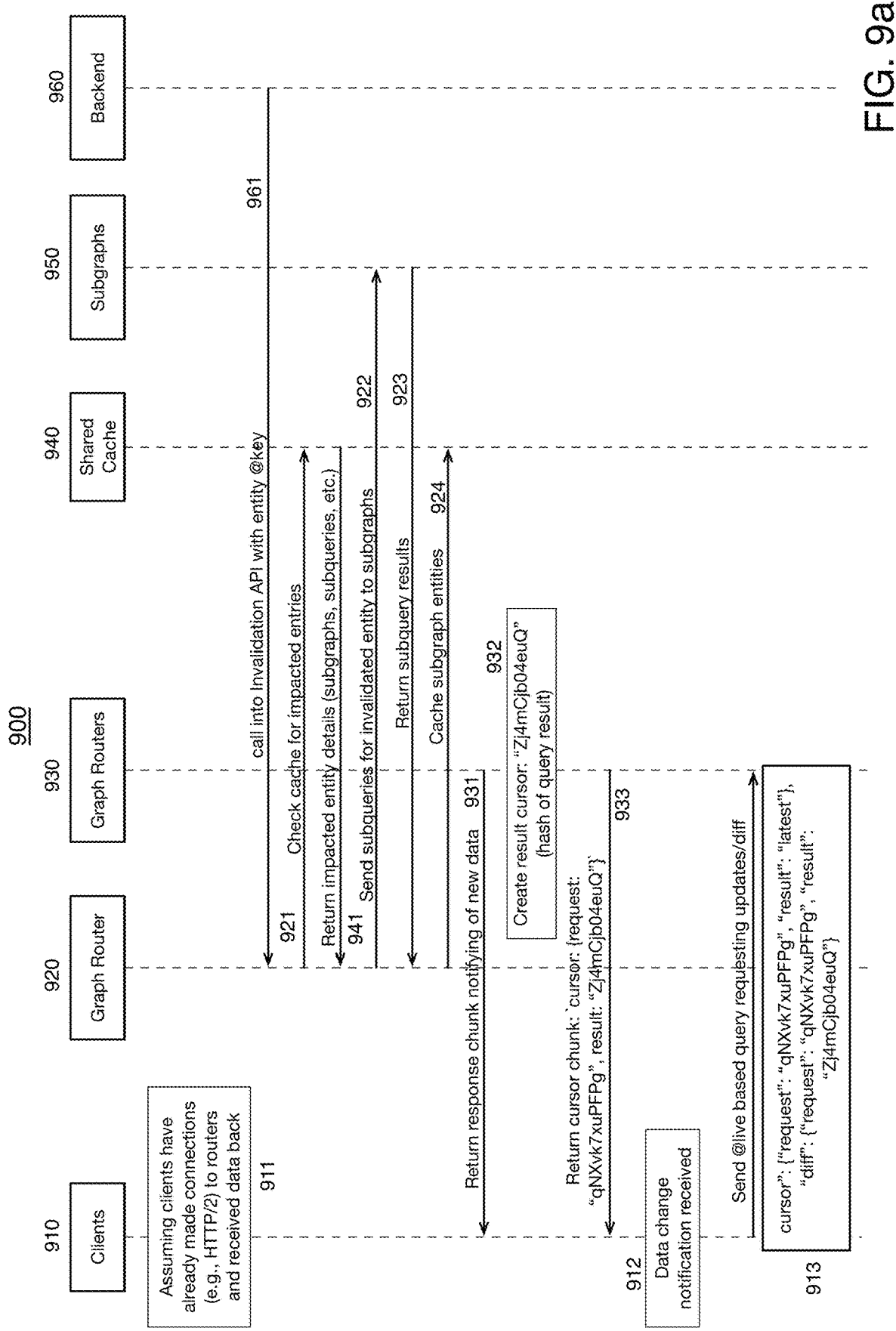

FIGS. 9a-9b depict a message flow diagram 900 for an example live query process including historical shared caching of subgraph fetches and/or incremental delivery of @live query results, including, for example, incremental diff updates. Example message flow diagram 900 may also include efficient re-fetching of underlying data for scalable responsive updates and/or may include responsive detection of underlying data changes in a supergraph, in implementations.

As indicated, one or more client computing devices, such as clients 910, it may be assumed for this example that clients 910 have already made connections (e.g., HTTP/2) to one or more routers (e.g., graph routers 920, 930, etc.) and have received content (e.g., data) back. See block 911, for example. As further depicted at arrow 961, a backend server computing device, such as backend 960, may call into an Invalidation API with an entity @key, for example. In implementations, the call into the API may be obtained by a graph router, such as graph router 920, for example.

In implementations, graph router 920 may check a shared cache data structure, such as shared cache 940, for entries impacted by the invalidation call, as indicated at arrow. Further, shared cache 940 may return impacted entity details (e.g., subgraphs, subqueries, etc.) to graph router 920, for example, as indicated at arrow 941. Additionally, as indicated at arrow 922, graph router 920 may send one or more subqueries for an invalidated entity to one or more subgraphs, such as subgraphs 950, for example. As further indicated at arrow 923, subquery results may be returned from subgraphs 950 to graph router 920. Also, graph router 920 may initiate caching of subgraph entities in shared cache 940, as indicated at arrow 924, for example.

As mentioned, for this example it may be assumed that one or more clients have already established connections with routers, such as graph router 920 and/or one or more graph routers 930. As indicated at arrow 931, one or more graph routers 930, responsive at least in part to having detected updated live query data, may return a response chunk notifying one or more clients 910 of new data, for example. Graph router(s) 930 may further create a result cursor, such as "Zj4mCjb04euQ" (hash of query result), for example, as indicated at block 932. Also, as indicated at arrow 933, graph router(s) 930 may return a cursor chunk, such as 'cursor: {request: "qNXvk7xuPFPg", result: "Zj4mCjb04euQ"}', to client(s) 910, in implementations.

In implementations, as indicated at block 912, one or more clients 910 may receive a data change notification. As further indicated at block 913, client(s) 910 may send an @live based query requesting updates and/or diff content. In implementations, A cursor, such as cursor": {"request": "qNXvk7xuPFPg", "result": "latest"}, "diff": {"request": "qNXvk7xuPFPg", "result": "Zj4mCjb04euQ"} may be generated, for example, as also indicated at block 913.

For example message flow 900, graph routers 930 may build a query plan and/or may extract subgraph queries, as indicated at block 934. As further indicated at arrow 935, graph routers 930 may check shared cache 940 for subgraph entities, for example. As also indicated at block 936, shared cache 940 may check for result: "latest" and result: "Zj4mCjb04euQ" in implementations. Additionally, for example, shared cache 940 may find and return entity data to graph routers 930, as indicated at arrow 942.

Additionally, as indicated at block 937, graph routers 930 may calculate a diff between result: "latest" and result: "Zj4mCjb04euQ", for example. In implementations, graph routers 930 may merge subquery results into a single result, for example, as indicated at block 938. Further, as indicated at arrow 939, graph routers 930 may return response data with a query result chunk to clients 910. Graph routers 930 may also generate a result cursor: "3qtDZLpptk2" (hash of query result), for example, as indicated at block 971. As additionally depicted at arrow 972, graph routers 930 may return cursor chunk: 'cursor: {request: "qNXvk7xuPFPg", result: "3qtDZLpptk2"}' to clients 910, in implementations.

Figure 10B:
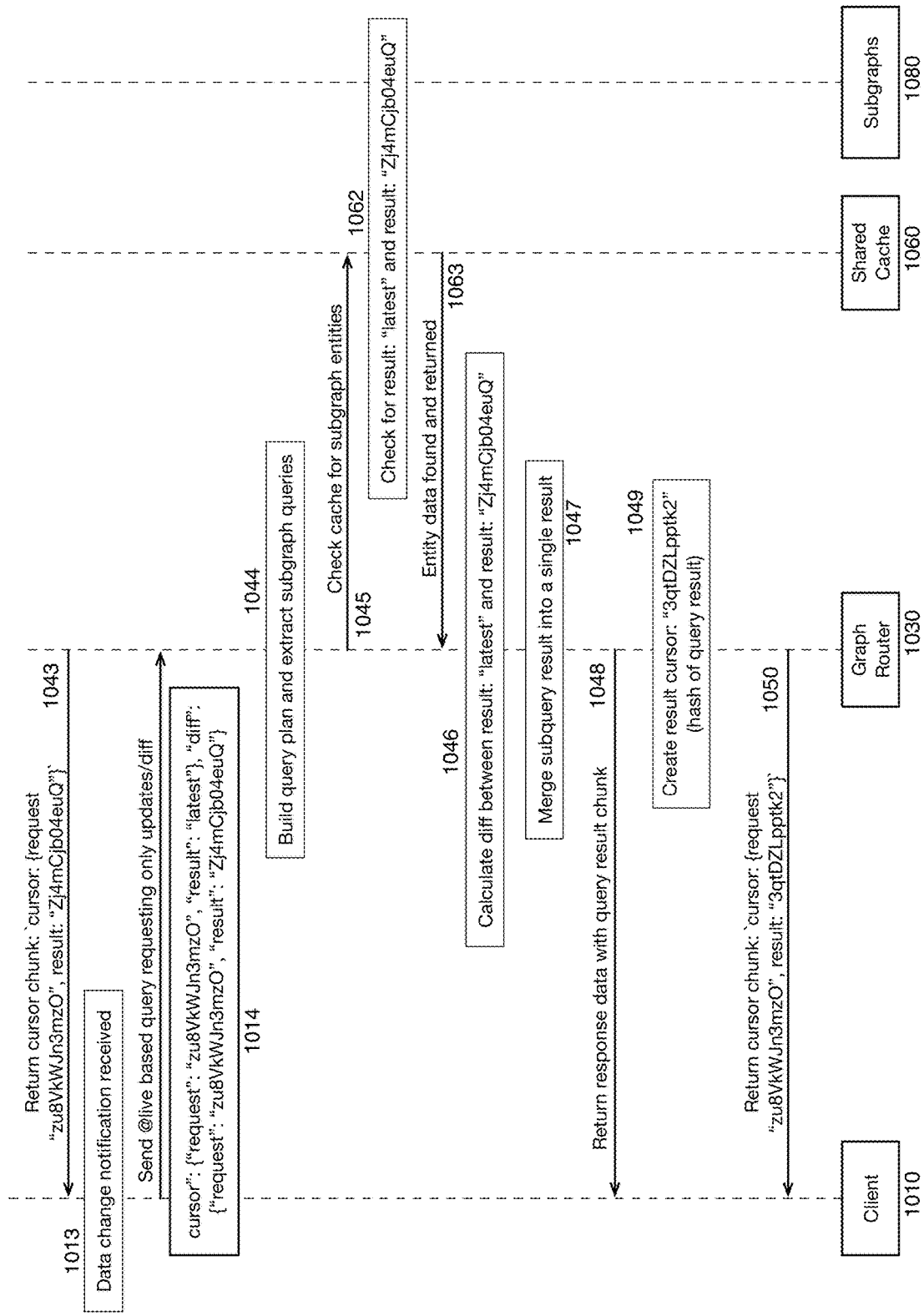

FIGS. 10a-10b depict a message flow diagram 1000 for an example live query process including historical shared caching of subgraph fetches and/or incremental delivery of @live query results, including time-to-live support for cache entries, in implementations. Further, in implementations, example message flow diagram 1000 may also include responsive detection of underlying data changes in a supergraph, for example.

In implementations, as indicated at block 1011, a client computing device, such as client 1010, may establish bi-directional connections (e.g., HTTP/2). As also indicated at block 1031, a graph router computing device, such as graph router 1030, may be configured with TTL for an entity "X". In implementations, client 1010 may send an @live based query with 'cursor: "latest"' as depicted at arrow 1012. As additionally shown at block 1032, graph router 1030 may build a query plan and/or may extract subgraph queries, for example. Further, graph router 1030 may check a shared cache data structure, such as shared cache 1060, for subgraph entities as indicated at arrow 1033, and shared cache 1060 may return any found entity content (e.g., data) to graph router 1030 as depicted at arrow 1061.

Further, it may be noted that, as indicated at block 1034, entity X TTL has not expired at this point in example process 1000, for example. Also, in implementations, graph router 1030 may merge data into a single result, as indicated at block 1035, and may return response data with a query result chunk to client 1010 as indicated at arrow 1036. As indicated at arrow 1037, a return cursor chunk may be represented as 'cursor: {request "zu8VkWJn3mzO", result: "5oNVvbR0kLLY"}', for example. Of course, subject matter is not limited in scope in these respects.

It may be noted that, at this point in example message flow diagram 1000, after the passage of a period of time (e.g., ranging from almost immediate to longer periods), entity X TTL may have expired. Responsive at least in part to expiration of entity X TTL, graph router 1030 may send subqueries to one or more subgraphs, such as subgraphs 1080, for example, as indicated at arrow 1039. In implementations, subgraphs 1080 may return subquery results to graph router 1030 as indicated at arrow 1081, for example. Further, as indicated at arrow 1040, graph router 1030 may initiate caching of subgraph entities at shared cache 1060, for example.

As additionally indicated at arrow 1041, a response chunk notifying of new data may be returned from graph router 1030 to client 1010, in an implementation. Also, a result cursor may be created, wherein the cursor may be represented as "Zj4mCjb04euQ" (hash of query result), as indicated at block 1042, for example. As also indicated at arrow 1043, a return cursor chunk, represented as 'cursor: {request "zu8VkWJn3mzO", result: "Zj4mCjb04euQ"}', may be provided from graph router 1030 to client 1010, for example.

In implementations, a data change notification may be received at client 1010. An @live based query requesting updates and/or diff may be sent from client 1010 to graph router 1030, for example. Also, a cursor may be generated, such as cursor": {"request": "zu8VkWJn3mzO", "result": "latest"}, "diff": {"request": "zu8VkWJn3mzO", "result": "Zj4mCjb04euQ"}, for example, as indicated at block 1014.

Additionally, as indicated at block 1044, graph router 1030 may build a query plan and/or may extract subgraph queries, in implementations. Also, as indicated at arrow 1045, graph router 1030 may check shared cache 1060 for subgraph entities. For example, shared cache 1060 may check for result "latest" and result: "Zj4mCjb04euQ" as indicated at block 1062. Further, shared cache 1060 may locate and may return entity data, as indicated at arrow 1063. Also, as indicated at block 1046, a diff may be calculated at graph router 1030 between result: "latest" and result: "Zj4mCjb04euQ", for example. In implementations, graph router 1030 may merge data (e.g., returned entity data) into a single result, for example, as indicated at block 1047.

Further, as indicated at arrow 1048, graph router 1030 may return response data with a query result chunk to client 1010. Graph router 1030 may also generate a result cursor: "3qtDZLpptk2" (hash of query result), for example, as indicated at block 1049. As additionally depicted at arrow 1050, graph router 1030 may return cursor chunk: 'cursor: {request: "zu8VkWJn3mzO", result: "3qtDZLpptk2"}' to client 1010, in implementations.

Figure 11A:
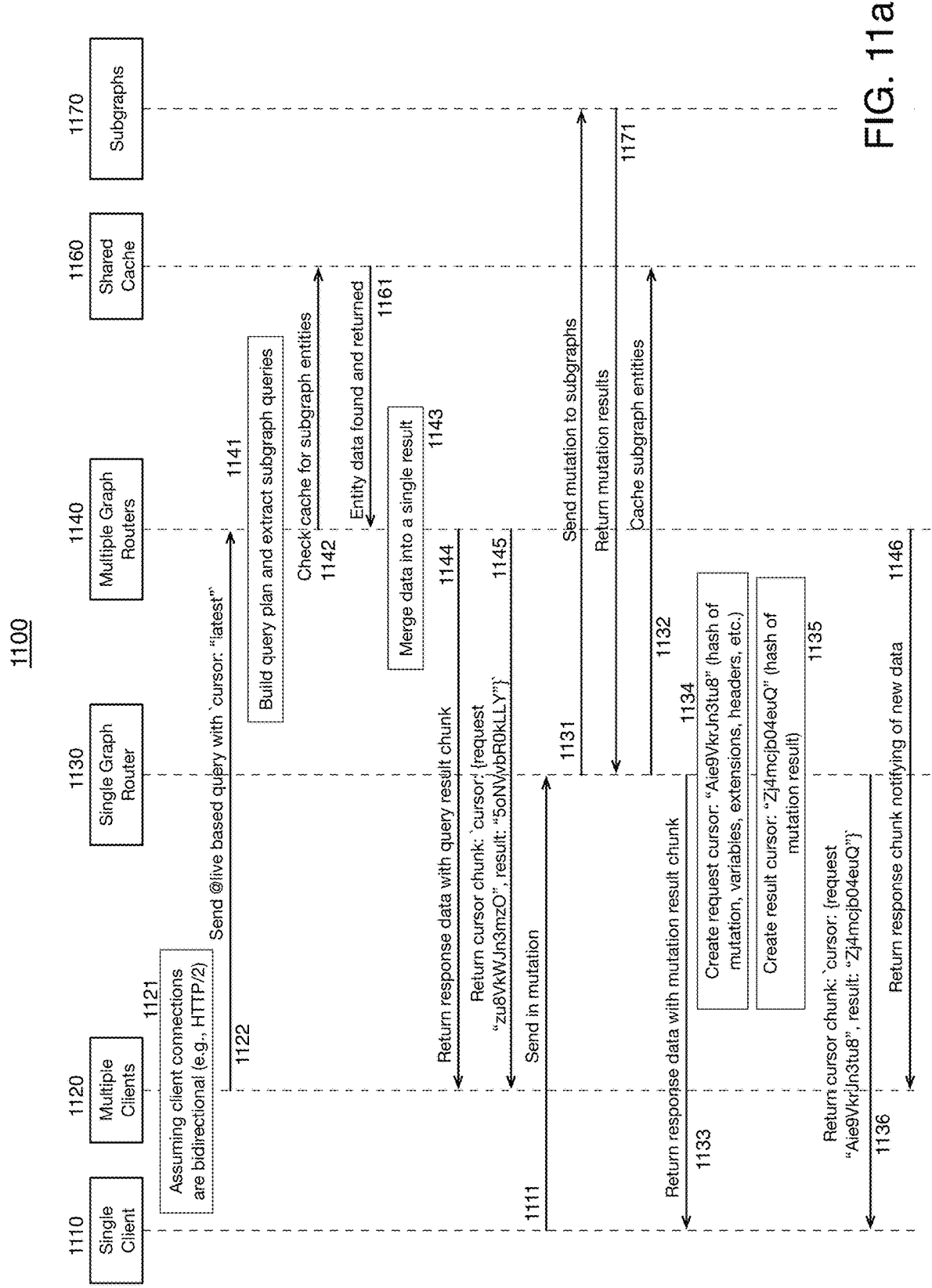

FIGS. 11a-11b depict a message flow diagram 1100 for an example live query process including multiple clients, such as client 1110 and/or clients 1120, and/or multiple graph router computing devices, such as graph router 1130 and/or graph routers 1140. Further, in implementations, example message flow diagram 1100 may also include responsive detection of underlying data changes in a supergraph, for example.

In implementations, it may be assumed for the present example that client connections are bidirectional (e.g., HTTP/2), as indicated at block 1121. Further, as indicated at arrow 1122, clients 1120 may send an @live based query with 'cursor: "latest", for example. In implementations, the @live based query may be received at one or more of graph routers 1140, as indicated again at arrow 1122. Additionally, for example, graph routers 1140 may build a query plan and/or may extract subgraph queries, as indicated at block 1141. Also, as indicated at arrow 1142, graph routers 1140 may check a shared cache data structure, such as shared cache 1160, for subgraph entities. For this example, shared cache 1160 may locate and may return entity data, as indicated at arrow 1161. In implementations, graph routers 110 may merge data (e.g., returned entity data) into a single result, for example, as indicated at block 1143. Graph routers 1140 may further return response data with a query result chunk to clients 1120 as indicated at arrow 1144. As indicated at arrow 11145, a return cursor chunk may be represented as 'cursor: {request "zu8VkWJn3mzO", result: "5oNVvbR0kLLY"}', for example. Of course, subject matter is not limited in scope in these respects.

In implementations, client 1110 may send a mutation to graph router 1130, for example. Further, for example, graph router 1130 may send the mutation to subgraphs, such as subgraphs 1170, as indicated at arrow 1131. Additionally, subgraphs 1170 may return mutation results to graph router 1130, for example, as indicated at arrow 1171. Also, graph router 1130 may initiate caching of subgraph entities in shared cache 1160, as indicated at arrow 1132, for example.

In implementations, graph router 1130 may return query response content (e.g., query response chunk) with mutation result chunk to client 1110, as indicated at arrow 1133. In implementations, graph router 1130 may create a result cursor. For example, graph router 1130 may create cursor "Aie9VkrJn3tu8" (hash of mutation, variables, extensions, headers, etc.), as indicated at block 1134. Further, for example, graph router 1130 may also generate a result cursor, such as "Zj4mcjb04euQ" (hash of mutation result), as indicated at block 1135. Additionally, graph router 1130 may return a cursor chunk, such as 'cursor: {request "Aie9VkrJn3tu8", result: "Zj4mcjb04euQ"}', to client 1110, for example, as indicated at arrow 1136. Of course, subject matter is not limited in scope to these particular example cursors and such.

As further indicated at arrow 1146, graph routers 1140, responsive at least in part to having detected updated live query data, may return a response chunk notifying of new data to clients 1120, for example. Graph routers 1140 may further create result cursor: "Zj4mcjb04euQ" (hash of query result) as indicated at block 1147, for example. Also, in implementations, a cursor chunk: 'cursor: {request "zu8VkWJn3mzO", result: "Zj4mcjb04euQ"}' may be communicated from graph routers 1140 and clients 1120, for example.

Further, in implementations, a data change notification may be received at client 1110 and/or at clients 1120, as indicated at block 1112. In implementations, an @live based query, requesting updates and/or diff content, for example, may be sent from clients 1120 to graph routers 1140. For example, an example cursor may be represented as cursor": {"request": "zu8VkWJn3mzO", "result": "latest"}, "diff": {"request": "zu8VkWJn3mzO", "result": "Zj4mCjb04euQ"} as indicated at block 1123.

Additionally, as indicated at block 1149, graph routers 1140 may build a query plan and/or may extract subgraph queries, in implementations. Also, as indicated at arrow 1150, graph routers 1140 may check shared cache 1160 for subgraph entities. For example, shared cache 1160 may check for result "latest" and result: "Zj4mcjb04euQ" as indicated at block 1151. Further, shared cache 1160 may locate and may return entity data, as indicated at arrow 1162. Also, as indicated at block 11152, a diff may be calculated at graph routers 1140 between result: "latest" and result: "Zj4mCjb04euQ", for example. In implementations, graph routers 1140 may subquery results into a single result, for example, as indicated at block 1153.

Further, as indicated at arrow 1154, graph routers 1140 may return response data with a query result chunk to clients 1120. Graph routers 1140 may also generate a result cursor: "3qtDZLpptk2" (hash of query result), for example, as indicated at block 1155. As additionally depicted at arrow 1156, graph routers 1140 may return cursor chunk: 'cursor: {request: "zu8VkWJn3mzO", result: "3qtDZLpptk2"}' to clients 1120, in implementations.

Figure 12A:
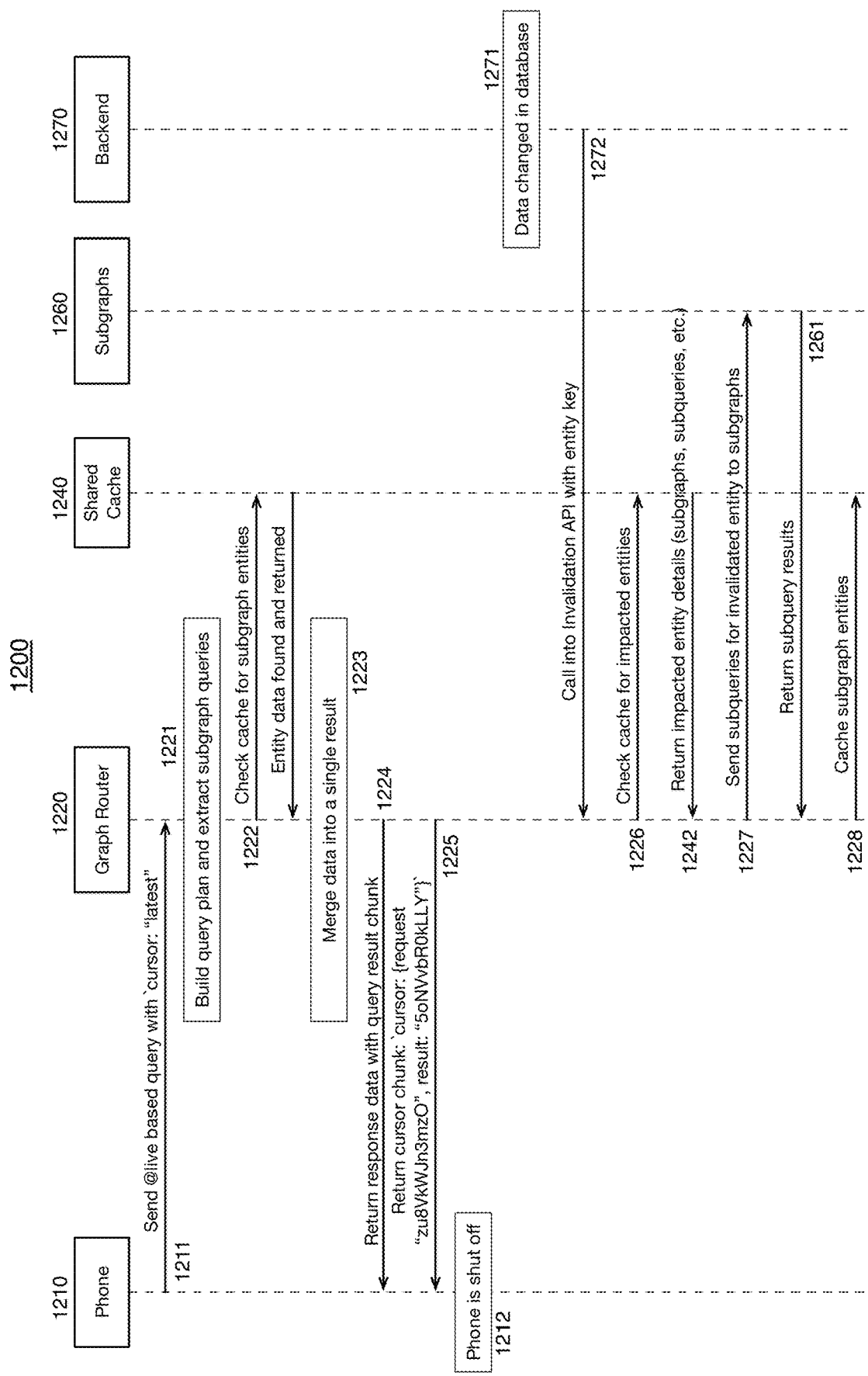

FIGS. 12*a*-12*b* depict a message flow diagram 1200 for an example live query process including historical shared caching of subgraph fetches and/or incremental delivery of @live query results, including preservation of cursor state across dynamic re-connection of clients, for example. For example message flow diagram 1200, a phone, such as phone 1210, is discussed. Although the present example refers to a phone, implementations described herein may be applicable to a wide range of computing devices, including mobile phones, for example. Additionally, phone 1210 may comprise a client computing device, in implementations.

As indicated at arrow 1211, phone 1210 may send an @live based query with 'cursor: "latest", for example. In implementations, a graph router computing device, such as graph router 1220, may build a query plan and/or may extract subgraph queries, as indicated at block 1221. Further, graph router 1220 may check a shared cache data structure, such as shared cache 1240, for subgraph entities as indicated at arrow 1222, and shared cache 1240 may return any found entity content (e.g., data) to graph router 1220 as indicated. Also, in implementations, graph router 1220 may merge data into a single result, as indicated at block 1223, and may return response data with a query result chunk to phone 1210 as indicated at arrow 1224. As indicated at arrow 1225, a return cursor chunk may be represented as 'cursor: {request "zu8VkWJn3mzO", result: "5oNVvbR0kLLY"}', for example, which may be communicated to phone 1210. Further, at block 1212, phone 1210 may be shut off, for example.

In implementations, example message flow diagram 1200 may include a determination that data has changed in a database of backend server computing device, such as backend 1270, for example. As indicated at arrow 1272, backend 1270 may call into an Invalidation API with an entity key, for example. As depicted at arrow 1226, graph router 1220 may initiate a check of shared cache 1240 for impacted entities. Further, for example, shared cache 1240 may return impacted entity details (e.g., subgraphs, subqueries, etc.) to graph router 1220. In implementations, graph router 1220 may send subqueries for an invalidated entity to subgraphs, as indicated at arrow 1227. Further, for example, subgraphs 1260 may return subquery results to graph router 1220, as indicated at arrow 1261. Additionally, in an implementation, graph router 1220 may initiate caching of subgraph entities in shared cache 1240, as indicated at arrow 1228.

For example message flow diagram 1200, phone 1210 may be turned back on and/or may be reconnected, as indicated at block 1213, in implementations. An @live based query requesting updates and/or diff may be sent from phone 1210 to graph router 1220, for example. Also, a cursor may be generated, such as cursor': {"request": "zu8VkWJn3mzO", "result": "latest"}, "diff": {"request": "zu8VkWJn3mzO", "result": "5oNVvbR0kLLY"}, for example, as indicated at block 1214.

Additionally, as indicated at block 1229, graph router 1220 may build a query plan and/or may extract subgraph queries, in implementations. Also, as indicated at arrow 1230, graph router 1220 may check shared cache 1240 for subgraph entities. For example, shared cache 1060 may check for result "latest" and result: "5oNVvbR0kLLY" as indicated at block 1243. Further, shared cache 1240 may locate and may return entity data, as indicated at arrow 1244. Also, as indicated at block 1231, a diff may be calculated at graph router 1220 between result: "latest" and result: "5oNVvbR0kLLY", for example. In implementations, graph router 1220 may merge subquery results into a single result, for example, as indicated at block 1232.

Further, as indicated at arrow 1233, graph router 1220 may return response data with a query result chunk to phone 1210, for example. Graph router 1220 may also generate a result cursor: "Qj4mCjb04euQ" (hash of query result), for example, as indicated at block 1234. As additionally depicted at arrow 1235, graph router 1220 may return cursor chunk: 'cursor: {request: "zu8VkWJn3mzO", result: "Qj4mCjb04euQ"}' to phone 1210, in implementations.

The following discussion may include additional example aspects pertaining to embodiments and/or implementations discussed herein, including example message flows 800, 900, 1000, 1100, and/or 1200. The additional example aspects may further pertain to example processes 600 and/or 700, in implementations.

In implementations, an aspect of a live query-type approach may include graph router support for @live queries in a supergraph and for public APIs. At least some alternate approaches may include a naïve approach that may merely move polling from a client into a supergraph runtime. Such approaches may not be sufficiently efficient, scalable, and/or may not be immediately responsive, for example. Such naïve-type approaches also may require build time compilation of specific client queries using a closed-world model. In some circumstances, such approaches may not be suitable for public APIs or a global graph where a full list of specific client queries may not be known ahead of time but may rather be dynamically created by external actors.

In a live query-type approach, graph router support for an @live directive may go far beyond what may be offered by alternative approaches. For example, a live query-type approach in a graph router described herein may leverage federated-type architectures, such as federated-type approaches discussed above. In particular, for example, federated subgraphs and/or entities may be leveraged in a beneficial way. Also, in implementations, a live query-type approach described herein may be suitable for use in open-world environments where it may be advantageous to make all theoretically possible API queries available to potential users of a public API, for example, and/or where multiple public APIs may be linked together to form a global graph that may dynamically link multiple public APIs together.

An additional aspect of a further approach to live queries in a graph router described herein may include scalable Olive query data flow for responsive updates. For example, a client may send an initial @live query and a graph router may return an initial query response and may also return a cursor that represents a snapshot of data sent to the client. Further, a graph router may maintain a historical shared subgraph fetch cache including cursors that can key into the subgraph fetch cache, for example.

In implementations, underlying data changes may be captured via a graph router's entity invalidation API called from user defined event handlers, such as: webhooks, event listeners, Kafka observers, or data update hooks, which may call the graph router's federated entity invalidation API passing the federated entity @key to invalidate. Additionally, for immediate update and/or low-latency (ms) use cases an additional client directive, such as @eager, may inform a graph router to send delta updates directly in invalidation notifications to clients so they don't have to subsequently re-fetch a live query, thereby further reducing latency. In a graph router invalidation API, an additional invalidation payload may be provided to even further reduce latency, for example. In an implementation, a graph router invalidation API may include entity fields available from an invalidation event handler that may be utilized to more optimally serve @eager live queries with lower latency performance commensurate with subscriptions, for example, but with the better developer experience of @live queries.

In implementations, underlying data changes may be captured via a graph router's automatic entity invalidation using observed GraphQL mutations suitable for propagating one client's in-app changes to all clients and/or for immediate update and/or lower-latency (e.g., milliseconds) use cases. Underlying data changes may be further be captured via timeout of a cache entry's time-to-live (TTL), including graph router global TTL (e.g. every 60 minutes—for slower to change data) and/or per subgraph fetch TTL from HTTP cache-control response header (e.g., every minute for some faster changing data, and/or if not many subgraphs return valid cache-control headers), for example. Of course, subject matter is not limited in scope in these respects.

In implementations, a graph router may efficiently cascade invalidation to cached subgraph fetches (e.g., all cached subgraph fetches) that reference the entity @key. Invalidated subgraph fetches may be immediately (e.g., without undue delay) re-fetched from underlying subgraphs by a single graph router instance and/or may be saved to a shared cache for a graph router fleet (e.g., 100 s of graph router instances) to use. Further, graph router instances (e.g., all graph router instances) may immediately (e.g., without undue delay) stream efficient live query updates to connected clients (e.g., all connected clients). For example, graph routers may send a change notification only, wherein clients may fetch a diff update from the graph router at the time of the clients' choosing, and/or may send a change notification with embedded diff update (e.g., clients may not need to fetch a diff update because it is embedded in the change notification, and/or suitable for ultra-low latency applications).

In implementations, a graph router may serve diff updates to clients at any time in a stateless fashion. Clients may request diff updates for a desired query cursor (e.g., latest) and/or a current cursor (e.g., <hash of current state>), for example. A graph router may use cursors and/or a historical shared subgraph fetch cache to compute a diff update to send to the client, in implementations. Further, a graph router may respond to clients with an efficient diff update format, for example.

An additional aspect of live query-type approaches, such as those described herein, may include historical shared cache of subgraph fetches. For example, subgraph fetch caching may have been implemented in some systems, but not in a supergraph runtime and/or not to the extent as example approaches described herein. In implementations, a graph router fleet may remembers/cache subgraph fetches (e.g., all subgraph fetches) used for all live client queries, so a graph router fleet may have a historical view of subgraph fetches (e.g., up to some limit). Graph router instances in a fleet may use cached subgraph fetches to serve different query shapes that may happen to fetch the same fields from a given subgraph. Subgraph fetch caching may have smaller granularity vs. whole query response caching (e.g., may often be tainted with just one field of private user data), therefore cached subgraph fetches may be shared across multiple clients more often. In implementations, a subgraph fetch cache (e.g., shared cache data structure) may be structured so multiple cached subgraph fetches may be readily invalidated with a federated entity @key, for example. In implementations, shared subgraph fetch caches may also support a TTL (time-to-live) for individual cache entries, so the individual cache entries may be automatically invalidated when their particular TTLs have expired.

A further aspect of live query-type approaches described herein may include efficient re-fetching of underlying data for scalable responsive updates. In implementations, a graph router fleet may track subgraph fetch cache invalidations from various sources. For example, a graph router may pull updated data into a shared subgraph fetch cache (e.g., shared cache data structure) as underlying data changes, such as to preheat the cache before change notifications are sent to clients. Responsive to a cached subgraph fetch becoming invalidated (i.e. not latest/current), a single graph router in the fleet may re-fetch the invalidated subgraph fetch and/or may store it in a shared cache history for other graph router instances in the fleet to use. Graph router instances (e.g., all graph router instances) in the fleet may then be notified that a subgraph fetch has changed, and they, in turn, may responsively notify connected clients with @live queries that need updated data so the propagation delay from a data change event to a user's perception as the user is looking at an app display (e.g., mobile phone screen) may be immediate (e.g., without undue delay) and/or responsive.

An additional aspect of live query-type approaches described herein may include incremental delivery of initial Olive query results. For example, a client may request an initial @live query with "cursor": {"request": "qNXvk7xuPFPg", "result": "latest"}. In implementations, a graph router may return a full initial query response and a new cursor location that may identify a snapshot of data the client may have received for the @live query. In implementations, an initial response may be delivered incrementally in a multi-part chunked response, such as: data chunk 1 (hasNext: true); data chunk 2 (hasNext: false); "cursor": {"request": "qNXvk7xuPFPg", "result": "E3qtDZLpptk2"}, for example. In implementations, the cursor location sent at the end may represent the snapshot of data sent to the client for future use by the client on subsequent requests.

A further aspect of live query-type approaches described herein may include incremental diff updates at the time of the clients' choosing. In implementations, such incremental diff updates at the time of the clients' choosing may be advantageous for mobile apps that may often go to sleep to save battery and that may, therefore, drop connections (e.g., transmission control protocol (TCP) connections) to the servers which may need to be re-established. In an example, a client may request an incremental @live query diff update using: "queryCursor": {"request": "qNXvk7xuPFPg", "result": "latest"}, "diff": {"request": "qNXvk7xuPFPg", "result": "E3qtDZLpptk2"} (e.g., diff from the end of the initial response). Further, a graph router may send a diff update to the client. The graph router may also retrieve cursor data from a historical shared cache and/or may compute a diff. The graph router may further send a diff response to the client with only the changes the client needs to update to the queryCursor (e.g., desired state), for example. In implementations, incremental diff updates may be a relatively efficient technique for clients to pull updated @live data from a graph router, reducing and/or minimizing the amount of data that may need to be sent.

Also, an aspect of live query approaches described herein may include responsive detection of underlying data chances in a supergraph. In implementations, a TTL cache expiry timeout may include a graph router global default TTL for subgraph fetches (e.g., all subgraph fetches) and/or may include a per subgraph fetch TTL, such as, for example, if provided via HTTP cache-control response header for a subgraph fetch. For example, a parameter cache-control: public, max-age=<seconds> may be specified. Further, for example, subgraph libraries, such as Apollo Server, for example, may support dynamically calculating a cache-control response header using a @cacheControl directive in a subgraph schema. In implementations, cache-control TTL may utilize seconds as a unit of time, so a TTL-based cache invalidation may have a minimum latency of 1 second, for example, although subject matter is not limited in scope in these respects. In implementations, a minimum latency parameter may be specified as ten seconds or more (e.g., hundreds of seconds) to prevent excessive re-fetching, for example. Again, subject matter is not limited in scope in these respects. Also, for example, if changes are detected vs. a previous subgraph fetch, invalidation signals may be generated. Further, in implementations, cache-control TTL by itself may not be generally suitable for responsive applications with low millisecond latency requirements, although subject matter is not so limited. For an example responsive application with low millisecond latency specifications, consider an IoT mobile app that may need to show a state of a light switch immediately after toggling it on.

Further implementations pertaining to responsive detection of underlying data changes in a supergraph may include a federated entity invalidation API (e.g., using an entity @key). For example, such implementations, may include immediate (e.g., without undue delay) updates with low millisecond response times. Also, for example, an invalidation API may trigger immediate (e.g., without undue delay) invalidation of a subgraph fetch cache by passing a federated entity @key to an entity invalidation API. Additionally, in implementations, an invalidation API may enable integration with change-data-capture (CDC), event sourcing, and/or other event-driven architectures that may be more prevalent in organizations that have, webhook handlers, event bus pub/sub handlers, database transaction logs change-data-capture (CDC) handlers, and/or distributed log (e.g., Kafka) observers/handlers, for example.

In implementations, no subgraph changes may be required for entity invalidation. For example, entity invalidation may be accomplished directly from where changes may be handled. Also, for example, support for multiple protocols for event handlers to use a graph router's entity invalidation API may be provided, in implementations. Example protocols may include, but are not limited to, gRPC, HTTP, GraphQL, etc.

In implementations, live query-type approaches including responsive detection of underlying data changes in a supergraph may comprise automatic entity invalidation using observed GraphQL mutations, for example. In implementations, automatic entity invalidation in a graph router may provide an expedient means for gaining invalidation for data changes (mutation operations) that may flow through the graph router (e.g., may enable users in an app to see other user's changes) and/or may require no backend work to manually integrate with a federated entity invalidation API, for example.

Further, an aspect of live query approaches described herein may include change notification streams tailored for client queries of interest, for example. In implementations, clients may connect to a stream of graph router change notifications. For example, clients may connect to a stream of graph router change notifications using stateless websockets, HTTP2, server-sent-events (SSE), and/or other protocols, for example. Also, clients may send query cursors of interest to a graph router. In implementations, graph router instances (e.g., all graph router instances) may continuously track changes to a shared subgraph fetch that would affect query cursors of interest. Further, for example, a graph router may notify (e.g., immediately notify) connected clients responsive at least in part to changes to a client's query cursors of interest, and/or the client may opt to fetch an incremental diff update from the graph router at the time of the client's choosing, in implementations. Additionally, a graph router may provide an option to stream incremental change diffs along with change notifications for ultra-low latency operations so the client may not have to fetch an incremental update after receiving a notification, for example.

Further, an aspect of live query approaches described herein may include no lost updates or lost cursor state across dynamic re-connection of clients. For example, mobile clients may often go to sleep to save battery, and therefore TCP connections and/or the like to a graph router may become frequently disconnected. In implementations, clients may re-establish connection to change stream updates at any time using the most recent cursor location they received from the graph router, such as "queryCursor": {"request": "qNXvk7xuPFPg", "result": "latest"} and/or "diff": {"request": "qNXvk7xuPFPg", "result": "E3qtDZLpptk2"}, for example. Of course, subject matter is not limited in scope in these respects.

In implementations, a graph router may key into its historical cache using queryCursor and/or diff cursor locations from a client. Also, in implementations, a graph router may calculate the difference and/or may return changed data (e.g., only changed data) in an incremental diff format, for example. This may help ensure that no change notifications are lost when a client is disconnected as may be the case with a subscription-based approach. This may also help ensure that efficient incremental diffs may be sent to bring a client up-to-date even when the client re-connects to a different graph router instance in the fleet, for example, by virtue of the client sending the cursors of interest and via the graph router fleet maintaining a historical shared cache of subgraph fetches, in implementations.

An additional aspect of live query approaches described herein may include suppression of volatile fields to avoid spurious change notification, in implementations. For example, volatile fields of lower importance may cause excess invalidation, excess re-fetching of data, and/or an excess of incremental updates to clients. These spuriously updated fields may often be included in a @live query but may be omitted as a trigger for pushing updates to clients, for example. Also, in implementations, a graph router may allow the invalidation of volatile fields or entities in a GraphQL schema to be selectively ignored, for example.

Generally, embodiments for a live-query approach, such as may be practiced in conjunction with GraphQL and/or the federated approaches discussed above, for example, may include one or more of the following attributes, techniques, approaches, operations, processes, systems, devices, etc.

For example, in implementations, a graph router may federate subgraph fetch/query results with the cache entries tagged with entity IDs in a way that supports more efficient cascading invalidations when an entity instance has changed (e.g., identified by the entity @key in Apollo Federation). Further, in implementations, a cache may be expiry-based (e.g., by default), and/or may be configured by taking advantage of existing @cacheControl directives on the subgraph schema, for example.

In implementations, a graph router may expose a federated entity invalidation API that may allow subgraph servers or other systems to invalidate cache results immediately (e.g., without undue delay). A graph router may handle automatic invalidation of federated entities (and/or associated subgraph fetch results cached by the graph router) by observing incoming GraphQL mutation operations, for example.

In implementations, a federated subgraph architecture may result in finer-grained subgraph fetches that may be more suitable for caching vs. whole query caching. For example, client queries may often have fields that may map to private user/personally identifiable information (PII) data. For example, when a query response comes back, the entire response may therefore be seen as comprising private data. This may mean that the whole query response may not be cached by an edge proxy, for example, without violating privacy. Federated subgraph fetches, however, often have public data such as, for example, product catalogs, flight info, sports scores, and so on. In cases where one of ten subgraph fetches have private user data, the other nine subgraph fetches with public data may be cached and/or shared across consumers resulting in faster overall query performance, reduced memory usage in the graph router cluster, increased scalability, and/or cost savings, for example. The graph router may greatly reduce the load on underlying subgraphs, many of which may source data from external paid services that may charge per request, thus also reducing overall graph operating expenses.

In implementations, a graph router may allow the invalidation of volatile fields or entities in a GraphQL schema to be selectively ignored. This may help avoid spurious and/or frequent updates when it is not critical to have updates to these fields invalidate associated subgraph fetches, thereby helping to avoid re-fetching associated data from the underlying subgraphs and/or pushing updates to connected clients.

With the above federated approach-type caching and/or invalidation capabilities built into the graph router, a real-time data system leveraging live queries may be supported as follows, for example. A client (e.g., Apollo Client) may offer support for @live directives in queries, and/or may work with the graph router to receive relevant change notifications. Also, a graph router may poll subgraphs whenever a subquery result that is part of a live query expires and/or may calculate diff results to detect data changes, for example. As an improvement, an implementation may support an entity tag (ETag)-like revalidation mechanism to make polling more lightweight, for example.

In implementations, a federated approach-type entity invalidation API built into a graph router may be used by backend developers to manually integrate into their CDC (change data capture) or event driven backend systems, to detect data changes as they happen, and/or to have the graph router: invalidate and re-fetch all federated subgraph fetch responses; compute diffs to identify the change/delta from what app clients are showing to users (the app state) vs. the new underlying subgraph fetch data; and/or send delta updates (e.g., optimized delta updates) to connected clients (e.g., all connected clients) with the new/changed data in an efficient transmission format, for example.

Also, in implementations, polling and the invalidation API may operate together and/or may be adopted incrementally. For example, polling as a fallback mechanism may allow customers to start using live queries right away, without waiting for backend changes to support faster real-time updates using a graph router invalidation API (e.g., unlike subscription-type approaches which may have to be adopted across the entire stack to be used). These live queries may adhere to a polling interval, for example, but may be upgraded to real-time at any point without client changes, in implementations.

Further, for example, when a client sends the graph router a GraphQL mutation, it may auto-invalidate associated cached federated subgraph fetch responses. The graph router may observe GraphQL mutations (e.g., and/or the types being mutated) and/or may leverage the federated architecture (e.g., @key) to know how to automatically invalidate only the subgraph fetches that may need to be updated when a GraphQL mutation has completed, for example. Such an implementation may deliver on the promise of no subgraph changes required and/or may provide a dramatically simpler developer experience, for example.

A particular area of uniqueness in example real-time data systems outlined above may include the use of GraphQL aware cursors to efficiently stream diff-based updates at scale. Some implementations of @live updates may often be very naïve. In some circumstances, a server may simply poll the query over and over and stream new results back to the client. This approach may be highly inefficient, not scalable, and/or may simply move polling that an application or client library might otherwise do into the backend.

For live query-type approaches, such as those described herein, a distributed and/or shared cache data structure may be maintained, wherein the distributed and/or shared cache data structure may comprise queries, variables, and/or subgraph fetch results, for example. A graph router, such as an Apollo Router, may leverage cursors to identify data a client and/or application currently has, may efficiently detect changes, and/or may send delta updates back to clients in a multiplexed fashion, in implementations.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to cooperate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modeled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, MD, 21050-2747), but may include other aspects, such as the Hadoop distributed file system (HDFS) (available from the Apache Software Foundation, 1901 Munsey Drive, Forrest Hill, MD, 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a graph router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more graph routers, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 13:
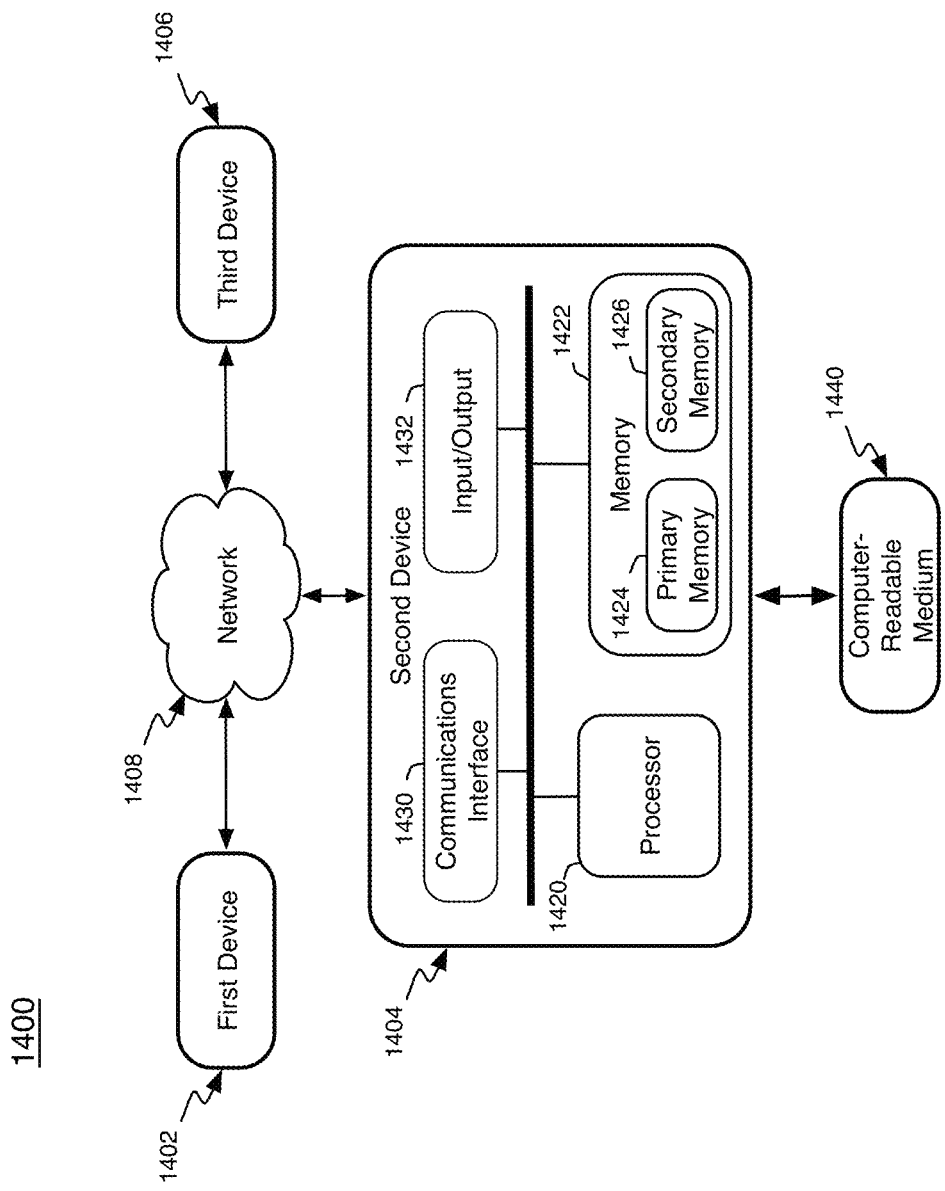
FIG. 13 depicts a schematic diagram illustrating an implementation of an example computing and/or communications environment, in accordance with an embodiment.

In one example embodiment, as shown in FIG. 13, a system embodiment may comprise a local network (e.g., device 1404 and medium 1440) and/or another type of network, such as a computing and/or communications network. For purposes of illustration, therefore, FIG. 13 shows an embodiment 1400 of a system that may be employed to implement either type or both types of networks. Network 1408 may comprise one or more network connections, links, processes, services, applications, and/or resources to facilitate and/or support communications, such as an exchange of communication signals, for example, between a computing device, such as 1402, and another computing device, such as 1406, which may, for example, comprise one or more client computing devices and/or one or more server computing device. By way of example, but not limitation, network 1408 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 13 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1-12 and in the text associated at least with the foregoing figure(s) of the present patent application.

Referring now to FIG. 13, in an embodiment, first and third devices 1402 and 1406 may be capable of rendering a graphical user interface (GUI) for a network device and/or a computing device, for example, so that a user-operator may engage in system use. Device 1404 may potentially serve a similar function in this illustration. Likewise, in FIG. 13, computing device 1402 (first device' in figure) may interface with computing device 1404 (second device' in figure), which may, for example, also comprise features of a client computing device and/or a server computing device, in an embodiment. Processor (e.g., processing device) 1420 and memory 1422, which may comprise primary memory 1424 and secondary memory 1426, may communicate by way of a communication bus 1415, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, sensor content, etc. in the form of signals and/or states. Thus, a computing device, in the context of the present patent application, may comprise hardware, software, firmware, or any combination thereof (other than software per se). Computing device 1404, as depicted in FIG. 13, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, endpoint and/or sensor nodes, gateway devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, sensor content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 13, computing device 1402 may provide one or more sources of executable computer instructions in the form physical states and/or signals (e.g., stored in memory states), for example. Computing device 1402 may communicate with computing device 1404 by way of a network connection, such as via network 1408, for example. As previously mentioned, a connection, while physical, may not necessarily be tangible. Although computing device 1404 of FIG. 13 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1422 may comprise any non-transitory storage mechanism. Memory 1422 may comprise, for example, primary memory 1424 and secondary memory 1426, additional memory circuits, mechanisms, or combinations thereof may be used. Memory 1422 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1422 may be utilized to store a program of executable computer instructions. For example, processor 1420 may fetch executable instructions from memory and proceed to execute the fetched instructions. Memory 1422 may also comprise a memory controller for accessing device readable-medium 1440 that may carry and/or make accessible digital content, which may include code, and/or instructions, for example, executable by processor 1420 and/or some other device, such as a controller, as one example, capable of executing computer instructions, for example. Under direction of processor 1420, a non-transitory memory, such as memory cells storing physical states (e.g., memory states), comprising, for example, a program of executable computer instructions, may be executed by processor 1420 and able to generate signals to be communicated via a network, for example, as previously described. Generated signals may also be stored in memory, also previously suggested.

Memory 1422 may store electronic files and/or electronic documents, such as relating to one or more users, and may also comprise a computer-readable medium that may carry and/or make accessible content, including code and/or instructions, for example, executable by processor 1420 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 13, processor 1420 may comprise one or more circuits, such as digital circuits, to perform at least a portion of a computing procedure and/or process. By way of example, but not limitation, processor 1420 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1420 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 13 also illustrates device 1404 as including a component 1432 operable with input/output devices, for example, so that signals and/or states may be appropriately communicated between devices, such as device 1404 and an input device and/or device 1404 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising: at a graph router computing device:
   obtaining a first query from a first client computing device, wherein the first query comprises an @live directive specifying particular content to be kept current at the first client computing device;
   obtaining content comprising a first query response from a shared cache structure or from one or more subgraphs, or a combination thereof;
   storing the content comprising the first query response in the shared cache structure if one or more elements of the first query response are not already cached;
   initiating transmission to the first client computing device of one or more signal packets representative of the content comprising the first query response and further representative of a first cursor comprising a snapshot of the content comprising the first query response; and
   maintaining the content comprising the first query response in the shared cache structure.

2. The method of claim 1, further comprising, at the graph router and responsive at least in part to the @live directive:
   recognizing which parts of the first query are tagged with the @live directive;
   determining when to re-execute the first query;
   determining a diff between older content pertaining to the first query and newer content pertaining to the first query; and
   transmitting to the first client computing device a patch comprising content based on the determined diff between the older content pertaining to the first query and the newer content pertaining to the first query to ensure the specified particular content is kept current at the first client computing device.

3. The method of claim 1, wherein the obtaining the content comprising the first query response from the one or more subgraphs comprises obtaining the content from a plurality of subgraphs.

4. The method of claim 3, wherein the shared cache structure comprises a cache structure stored across a plurality of server computing devices and/or wherein the shared cache structure is partitioned such that individual portions of the shared cache structure store content obtained from individual subgraphs of a plurality of subgraphs.

5. The method of claim 1, wherein the obtaining the content comprising the first query response from the shared cache structure comprises obtaining the content from one or more of the plurality of server computing devices to store the shared cache structure.

6. The method of claim 1, further comprising:
invalidating one or more entities specified by the one or more subgraphs via an invalidate API; and
communicating between a particular portion of the shared cache structure pertaining to a particular subgraph of the one or more subgraphs and other portions of the shared cache structure and/or other subgraphs of the one or more subgraphs to invalidate one or more entities specified via the invalidate API.

7. The method of claim 6, further comprising at least a second client computing device initiating invalidation of particular entities of the one or more entities via the invalidate API.

8. The method of claim 1, further comprising automatically invalidating particular entities within the shared cache structure and/or at the one or more subgraphs responsive at least in part to a mutation received by the graph router.

9. An apparatus, comprising: a graph router computing device to:
obtain a first query from a first client computing device, wherein the first query comprises an @live directive specifying particular content to be kept current at the first client computing device;
obtain content comprising a first query response from a shared cache structure or from one or more subgraphs, or a combination thereof;
store the content comprising the first query response in the shared cache structure if one or more elements of the first query response are not already cached;
initiate transmission to the first client computing device of one or more signal packets representative of the content comprising the first query response and further representative of a first cursor comprising a snapshot of the content comprising the first query response; and
maintain the content comprising the first query response in the shared cache structure.

10. The apparatus of claim 9, wherein the graph router computing device further to, responsive at least in part to the @live directive:
recognize which parts of the first query are tagged with the @live directive;
determine when to re-execute the first query;
determine a diff between older content pertaining to the first query and newer content pertaining to the first query; and
transmit to the first client computing device a patch comprising content based on the determined diff between the older content pertaining to the first query and the newer content pertaining to the first query to ensure the specified particular content is kept current at the first client computing device.

11. The apparatus of claim 9, wherein, to obtain the content comprising the first query response from the one or more subgraphs, the graph router computing device to obtain the content from a plurality of subgraphs.

12. The apparatus of claim 11, wherein the shared cache structure comprises a cache structure stored across a plurality of server computing devices and/or wherein the shared cache structure is partitioned such that individual portions of the shared cache structure store content obtained from individual subgraphs of a plurality of subgraphs.

13. The apparatus of claim 9, wherein, to obtain the content comprising the first query response from the shared cache structure, the graph router computing device to obtain the content from one or more of the plurality of server computing devices to store the shared cache structure.

14. The apparatus of claim 9, wherein the graph router computing device further to:
invalidate one or more entities specified by the one or more subgraphs via an invalidate API; and
initiate communication between a particular portion of the shared cache structure pertaining to a particular subgraph of the one or more subgraphs and other portions of the shared cache structure and/or other subgraphs of the one or more subgraphs to invalidate one or more entities specified via the invalidate API.

15. The apparatus of claim 9, wherein the graph router computing device comprises a plurality of graph router computing devices.

16. The apparatus of claim 9, wherein the graph router computing device to automatically invalidate particular entities within the shared cache structure and/or at the one or more subgraphs responsive at least in part to a mutation received by the graph router computing device.

17. A non-transitory computer-readable medium having stored thereon instructions executable by a graph router computing device to:
obtain a first query from a first client computing device, wherein the first query comprises an @live directive specifying particular content to be kept current at the first client computing device;
obtain content comprising a first query response from a shared cache structure or from one or more subgraphs, or a combination thereof;
store the content comprising the first query response in the shared cache structure if one or more elements of the first query response are not already cached;
initiate transmission to the first client computing device of one or more signal packets representative of the content comprising the first query response and further representative of a first cursor comprising a snapshot of the content comprising the first query response; and
maintain the content comprising the first query response in the shared cache structure.

18. The non-transitory computer-readable medium of claim 17, wherein the graph router computing device further to, responsive at least in part to the @live directive:
recognize which parts of the first query are tagged with the @live directive;
determine when to re-execute the first query;
determine a diff between older content pertaining to the first query and newer content pertaining to the first query; and
transmit to the first client computing device a patch comprising content based on the determined diff between the older content pertaining to the first query and the newer content pertaining to the first query to ensure the specified particular content is kept current at the first client computing device.

19. The non-transitory computer-readable medium of claim 17, wherein, to obtain the content comprising the first query response from the one or more subgraphs, the graph router computing device to obtain the content from a plurality of subgraphs.

20. The non-transitory computer-readable medium of claim 19, wherein the shared cache structure comprises a cache structure stored across a plurality of server computing devices and/or wherein the shared cache structure is partitioned such that individual portions of the shared cache structure store content obtained from individual subgraphs of a plurality of subgraphs.

* * * * *